(12) United States Patent
Sugimoto

(10) Patent No.: US 6,755,661 B2
(45) Date of Patent: Jun. 29, 2004

(54) METHOD AND SYSTEM FOR PERFORMING ADAPTIVE TEST

(75) Inventor: Koichi Sugimoto, Ota (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 09/854,685

(22) Filed: May 15, 2001

(65) Prior Publication Data

US 2002/0102522 A1 Aug. 1, 2002

(30) Foreign Application Priority Data

Jan. 31, 2001 (JP) ......................................... 2001-022644

(51) Int. Cl.$^7$ ............................... G09B 3/00; G09B 7/00
(52) U.S. Cl. ....................... 434/322; 434/323; 434/362; 434/350
(58) Field of Search ............................. 434/322, 323, 434/350, 362

(56) References Cited

U.S. PATENT DOCUMENTS

| | | | | |
|---|---|---|---|---|
| 3,981,087 A | * | 9/1976 | Sachs ..................... | 434/308 X |
| 6,077,085 A | * | 6/2000 | Parry et al. ............. | 434/322 X |
| 6,160,987 A | * | 12/2000 | Ho et al. ................. | 434/350 X |
| 6,270,352 B1 | * | 8/2001 | Ditto ........................ | 434/118 X |
| 6,418,298 B1 | * | 7/2002 | Sonnenfeld ............. | 434/350 X |
| 6,422,870 B1 | * | 7/2002 | Ohsawa ..................... | 434/236 |
| 6,431,875 B1 | * | 8/2002 | Elliot et al. .............. | 434/322 X |
| 2002/0018983 A1 | * | 2/2002 | Dixon ....................... | 434/327 |
| 2002/0106617 A1 | * | 8/2002 | Hersh ........................ | 434/236 |

FOREIGN PATENT DOCUMENTS

SU      780024    * 11/1980     ............ G09B/7/02

* cited by examiner

Primary Examiner—S. Thomas Hughes
Assistant Examiner—Chanda L. Harris
(74) Attorney, Agent, or Firm—Staas & Halsey LLP

(57) ABSTRACT

A method to perform an adaptive test performs a pressure sensitivity test to examine a pressure sensitivity of a solver to time, and judges, based on a result of the pressure sensitivity test, whether or not the pressure sensitivity of the solver is equal to or higher than a predetermined threshold. If the pressure sensitivity is equal to or higher than the predetermined threshold, the solver is prompted to answer a pending question, acquires an input of the answer, and determines if a time period consumed by the solver in answering the pending question is shorter than a time limit set for answering the pending question and, if shorter, gives the solver an increased time limit for answering a next question.

11 Claims, 14 Drawing Sheets

| No | Key | Abbreviated designation | Attribute | Name | Null |
|---|---|---|---|---|---|
| 1 | * | compno | char(8) | Company code | NotNull |
| 2 | | compnm | varchar2(50) | Company name | NotNull |
| 3 | | compaddress | varchar2(40) | Headquarter address | |
| 4 | | comptelno | varchar2(15) | Representative TEL | |
| 5 | | compfaxno | varchar2(15) | Representative FAX | |

Fig.3

| No | Key | Abbreviated designation | Attribute | Name | Null |
|---|---|---|---|---|---|
| 1 | * | compno | char(8) | Company code | NotNull |
| 2 | * | groupno | char(8) | Section code | NotNull |
| 3 | | groupnm | varchar2(40) | Section name | NotNull |
| 4 | | groupaddr | varchar2(40) | Section address | |
| 5 | | gtouptelno | varchar2(15) | TEL | |
| 6 | | groupfaxno | varchar2(15) | FAX | |

Fig.4

| No | Key | Abbreviated designation | Attribute | Name | Null |
|---|---|---|---|---|---|
| 1 | * | account | varchar2(25) | User ID | NotNull |
| 2 | * | id | long | Inside user ID | NotNull |
| 3 | | password | varchar2(50) | Password | NotNull |
| 4 | | email | | E-mail | NotNull |
| 5 | | namekj | varchar2(50) | Name(Kanji) | |
| 6 | | namekn | | Name(Kana) | |
| 7 | | mail_send_flag | smallint | Mail send flag [0:not transmitted/ 1:transmitted] | NotNull |
| 8 | | del_flag | smallint | Delete flag[0:not deleted/ 1:deleted] | NotNull |

Fig.5

| No | Key | Abbreviated designation | Attribute | Name | Null |
|---|---|---|---|---|---|
| 1 | * | id | long | Inside user ID | NotNull |
| 2 |  | reg_date | date | Registered date | NotNull |
| 3 |  | last_login | date | Last login date |  |
| 4 |  | admin | smallint | Authority(1/2/3/4) | NotNull |
| 5 |  | compno | char(8) | Company code |  |
| 6 |  | groupno | char(8) | Section code |  |

Fig.6

| No | Key | Abbreviated designation | Attribute | Name | Null |
|---|---|---|---|---|---|
| 1 | * | skill_code | char(6) | Skill category code | NotNull |
| 2 | * | edit_no | smallint | Version number | NotNull |
| 3 | * | prob_no | smallint | Question number | NotNull |
| 4 |  | prob_stat | long varchar2(400) | Question statement | NotNull |
| 5 |  | choice_no | smallint | Number of choices(fixed to 4) | NotNull |
| 6 |  | choice_1 | varchar2(255) | First choice | NotNull |
| 7 |  | choice_2 | varchar2(255) | Second choice | NotNull |
| 8 |  | choice_3 | varchar2(255) | Third choice | NotNull |
| 9 |  | choice_4 | varchar2(255) | Fourth choice | NotNull |
| 10 |  | correct | smallint | Right answer(1~4) | NotNull |
| 11 |  | skill | varchar2(50) | Object of study | NotNull |
| 12 |  | memo | varchar2(255) | Memo |  |
| 13 |  | auth_date | date | Registered date | NotNull |
| 14 |  | difficulty1 | float | First difficulty parameter | NotNull |
| 15 |  | difficulty2 | float | Second difficulty parameter |  |
| 16 |  | difficulty3 | float | Third difficulty parameter |  |
| 17 |  | limit_time | int | Time limit for answer(second) | NotNull |

Fig.7

| No | Key | Abbreviated designation | Attribute | Name | Null |
|---|---|---|---|---|---|
| 1 | * | skill_code | varchar2(6) | Skill category code | NotNull |
| 2 | * | edit_no | smallint | Version number | NotNull |
| 3 |  | category_name | varchar2(80) | Skill category name | NotNull |
| 4 |  | course_time | smallint | Test period (minute) | NotNull |
| 5 |  | course_exp | long varchar2(400) | Introduction of test |  |
| 6 |  | course_regdate | date | Registered date | NotNull |
| 7 |  | course_author | varchar2(50) | Registering author | NotNull |
| 8 |  | course_release | smallint(0/1) | Open/close | NotNull |
| 9 |  | course_probno | smallint | Question number | NotNull |
| 10 |  | course_skillno | smallint | Number of objects of the study | NotNull |

Fig.8

| No | Key | Abbreviated designation | Attribute | Name | Null |
|---|---|---|---|---|---|
| 1 | * | skill_code | varchar2(6) | Skill category code | NotNull |
| 2 | * | edit_no | smallint | Version number | NotNull |
| 3 | * | skill_id | varchar2(8) | Skill category inside code | NotNull |
| 4 | * | prob_user | varchar2(25) | User ID | NotNull |
| 5 | | prob_date | date | Test date | NotNull |
| 6 | | prob_time | time | Test time | NotNull |
| 7 | | answer_flag | smallint | 0:answering 1:has answered | NotNull |
| 8 | | prob_point | smallint | Point (number of correct answers) | |
| 9 | | no_prob | smallint | Number n of questions | |
| 10 | | score | float | Ability value | NotNull |
| 11 | | rest_time | int | Cumulated rest time period | |
| 12 | | add_1time_flag | int | Flag representing whether time period added to time limit for first question is reduced (0: not reduced/ 1: has reduced) | |
| 13 | | init_test_flag | int | Flag for initial test for distinguishing solvers (0: not performed/1: being performed/2: has been performed) | |
| 14 | | result_init_on | float | Ability value with time limit | |
| 15 | | result_init_off | float | Ability value without time limit | |

Fig.9

| No | Key | Abbreviated designation | Attribute | Name | Null |
|---|---|---|---|---|---|
| 1 | * | skill_code | varchar2(6) | Skill category code | NotNull |
| 2 | * | edit_no | smallint | Version number | NotNull |
| 3 | * | skill_id | varchar2(8) | Skill category inside code | NotNull |
| 4 | * | prob_user | varchar2(25) | User ID | NotNull |
| 5 | * | prob_no | smallint | Question number | NotNull |
| 6 | | answer | smallint | Answer | |
| 7 | | true-false | smallint | True or false | |

Fig.10

| No | Key | Abbreviated designation | Attribute | Name | Null |
|---|---|---|---|---|---|
| 1 | * | skill_code | varchar2(6) | Skill category code | NotNull |
| 2 | * | edit_no | smallint | Version number | NotNull |
| 3 | * | skill_id | varchar2(8) | Skill category inside code | NotNull |
| 4 | * | prob_user | varchar2(25) | User ID | NotNull |
| 5 | * | test_date | date | Test date | NotNull |
| 6 | * | test_time | time | Test time | NotNull |
| 7 | * | seq_no | int | Sequence number | NotNull |
| 8 | | ques_no | int | Question number | NotNull |
| 9 | | answercourse_name | char | Solution | NotNull |

Fig.11

| No | Key | Abbreviated designation | Attribute | Name | Null |
|----|-----|------------------------|-----------|------|------|
| 1 | | add_1time | int | Added time period (second) | NotNull |
| 2 | | init_test_mode | int | Processing mode in initial test for distinguishing solvers (0: not executed/1: time display or notification/2: time measurement) | |
| 3 | | init_test_max | int | Maximum number of output questions in initial test for distingnishing solvers | |
| 4 | | test_max | int | Maximum number of output questions | |
| 5 | | bound_press | float | Pressure threshold | |
| 6 | | bound_margin | float | Convergence error at ability calculation | |
| 7 | | init_difficult | float | Difficulty when initial difficulty for questions is not set | |

Fig.12

METHOD AND SYSTEM FOR PERFORMING ADAPTIVE TEST

BACKGROUND OF THE INVENTION

1. Field of the Invention

The present invention relates to a method for performing an adaptive test and, more particularly, to technology for properly evaluating a solver in the adaptive test.

2. Description of the Related Art

A test for evaluating an ability of a solver by giving test questions with degrees of difficulty, which are adjusted to the ability of the solver, is called an adaptive test. In this adaptive test, the number of questions is not fixed since outputs of the questions continue until the evaluation values based on results of the answers converge. Therefore, a time limit for each question is set and the solver has to answer each question within its time limit.

However, if the solver has to answer each question within its time limit, there are some undesirable cases where the solver feels much pressure and cannot calm down with time in mind to answer properly. If the solver feels time pressure, an efficient evaluation, which is a characteristic of the adaptive test, becomes impossible, because an accurate measurement of ability is impossible and results of the answers do not converge.

In addition, a preliminary test as to the test questions, which will be used, in the adaptive test is performed for some tens or hundreds of persons to grasp characteristics of the test questions in advance. The preliminary test is to compute the characteristics of questions using statistical methods.

Here, what we should note is that there is no time limit for each question in the preliminary test and the solvers can consume enough time in answering questions with high degrees of difficulty. However, in the actual adaptive test, even if the question is the same as in the preliminary test that is given, the time limit is set to each question. Since the solver cannot have enough time to answer questions with high degrees of difficulty, the solver becomes susceptible to the pressure of the time limit.

SUMMARY OF THE INVENTION

Therefore, an object of the present invention is to provide technology to reduce the pressure of the time limit, which is an obstruction to a proper evaluation of the ability, in the adaptive test to evaluate the ability of the solver.

In addition, another object of the present invention is to provide technology to reduce the pressure for persons who are sensitive to the pressure of the time limit.

A method of the present invention for performing an adaptive test by a computer comprises the steps of: prompting a solver to answer a question; acquiring and storing into a storage device, an input of an answer for the question by the solver; and if a time period the solver consumed to answer the question is shorter than the time limit for the question, performing a setting to a storage device so as to enable the solver to use a difference period between the time limit and the time period the solver consumed to answer the question and a time limit set for a next question followed by the question.

By this configuration, the difference period between the time limit and the time period the solver consumed to answer the question is added to the time limit set for the next question.Therefore, it becomes possible for the solver to adjust time allotment, for example, by answering easy questions quickly, and by applying the rest in answering difficult questions. As a result, the pressure of the time limit can be reduced.

In addition, the method may further include the steps of: performing a pressure sensitivity test (for example, an initial test to distinguish the solvers who are sensitive to the pressure in the preferred embodiment) for checking a sensitivity (for example, I evaluation (ability) value without pressure—evaluation value with pressure I in the preferred embodiment) of the solver to time; and judging whether or not the pressure sensitivity of the solver is equal to or higher than a predetermined reference, by the result of the pressure sensitivity test, wherein if it is judged that the pressure sensitivity of the solver is equal to or higher than the predetermined reference, above-described prompting step and steps subsequent to the prompting step may be performed.

That is, as to a person who is weak under the pressure (a person who has high pressure sensitivity), it becomes possible to add the difference period between the time limit and the time period the solver consumed to answer to the time limit set for the next question. On the other side, as to a person who is strong under the pressure (a person who has low pressure sensitivity), the adaptive test, which uses the normal time limit, is performed. Thus, it becomes easy for the person who is weak under the pressure of the time to show his or her actual ability and it becomes possible to properly evaluate his or her ability.

Even if it is configured so as to add the difference period between the time limit and the time period the solver consumed to answer to the time limit set for the next question, the fairness of the test is confirmed since the whole of the time limits is not changed if the number of questions is same (in some cases if the kinds of questions are also same).

A user terminal may execute in response to the server, following steps: displaying on a display a first question and information regarding a time limit for the first question; acquiring an answer for the first question from a solver; and if a solver answered for the first question before the time limit for the first question, displaying on the display a second question and information regarding a time period calculated by adding a time limit set for the second question to a rest of the time limit for the first question.

The user terminal may execute in response to the server, following steps: displaying on a display a first question and time that can progress from a starting time to a time limit for the first question; acquiring an answer for the first question from a solver; and if a solver answered for the first question before the time limit for the first question, displaying on the display a second question and time that can progress from a starting time to a time period calculated by adding a time limit set for the second question to a rest of the time limit for the first question.

A method for performing an adaptive test can be implemented by a combination of a program and a computer hardware, which is a computer system for performing an adaptive test. In this case, the program is stored on a storage medium, such as a floppy disk, a CD-ROM or a magneto-optical disk, or in a storage device, such as a semiconductor memory or a hard disk, while the intermediate processing results are temporarily stored in the memory. The program may be distributed via a computer network.

BRIEF DESCRIPTION OF THE DRAWINGS

FIG. 3 is a table showing an example of data stored in company master DB;

FIG. 4 is a table showing an example of data stored in section master DB;

FIG. 5 is a table showing an example of data stored in first user management DB;

FIG. 6 is a table showing an example of data stored in second user management DB;

FIG. 7 is a table showing an example of data stored in question master DB;

FIG. 8 is a table showing an example of data stored in test skill master DB;

FIG. 9 is a table showing an example of data stored in test history DB;

FIG. 10 is a table showing an example of data stored in test answer contents DB;

FIG. 11 is a table showing an example of data stored in question outputting history DB;

FIG. 12 is a table showing an example of data stored in parameter table DB;

DETAILED DESCRIPTION OF THE PREFERRED EMBODIMENTS

Figure 1:
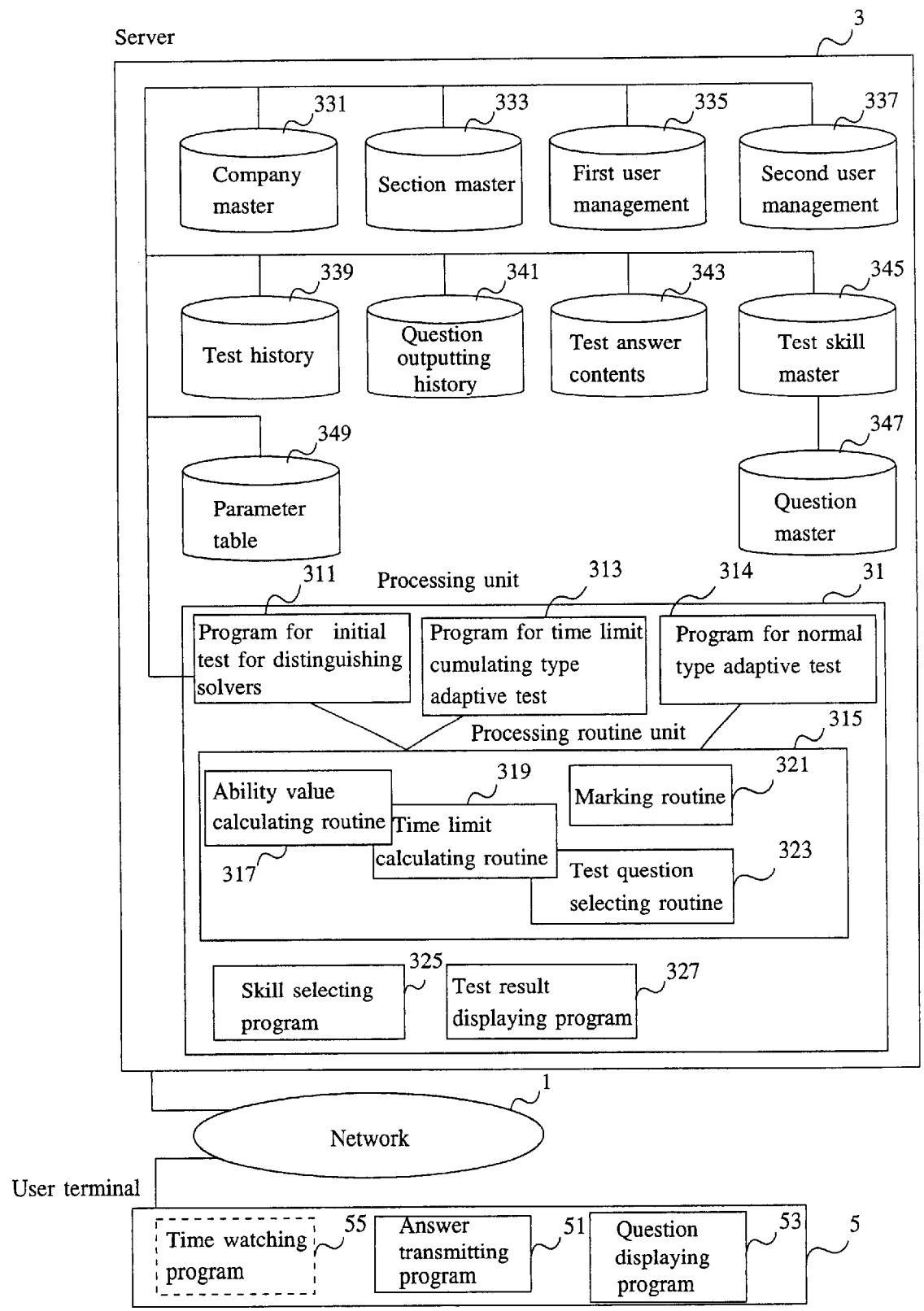
FIG. 1 is a diagram showing the outline of the system in an embodiment of the present invention.

FIG. 1 shows an outline of a system of an embodiment of the present invention. For example, a network 1, which is the Internet or an intranet, is connected with one or a plurality of servers 3 and one or a plurality of user terminals 5. The server 3 includes a processing unit 31. The processing unit 31 includes a program 311 for an initial test for distinguishing solvers, a program 313 for a time limit cumulating type adaptive test, a program 314 for a normal type adaptive test, a processing routine unit 315, which includes an ability value calculating routine 317, a time limit calculating routine 319, a test question selecting routine 323 and a marking routine 321, a skill selecting program 325 and a test result displaying program 327. The processing unit 31 may be configured so as to operate under the Web server function.

In addition, the processing unit 31 can use each type of database (DB) that the server 3 holds and manages in a storage device. That is, the server 3 can refer to a company master DB 331, a section master DB 333, a first user management DB 335, a second user management DB 337, a test history DB 339, a question outputting history DB 341, a test answer contents DB 343, a test skill master DB 345, a question master DB 347 and a parameter table DB 349.

On the other side, the user terminal 5 is a computer, which executes an answer transmitting program 51, a question displaying program 53 and a time watching program 55. If the server 3 has the Web server function and the adaptive test is performed by communicating with the Web browser installed into the user terminal 5, the answer transmitting program 51 and the question displaying program 53 may be realized by the Web browser. In addition, the time watching program 55 may be an applet to display the time elapsed or to notify the time elapsed via voice and may be executed on the Web browser (which includes a Java (a trademark of Sun Microsystems Inc.) VM (Virtual Machine)). The time watching program 55 may be a program to watch the time elapsed, which is distributed in advance by a service provider that uses and manages the server 3.

Figure 2:
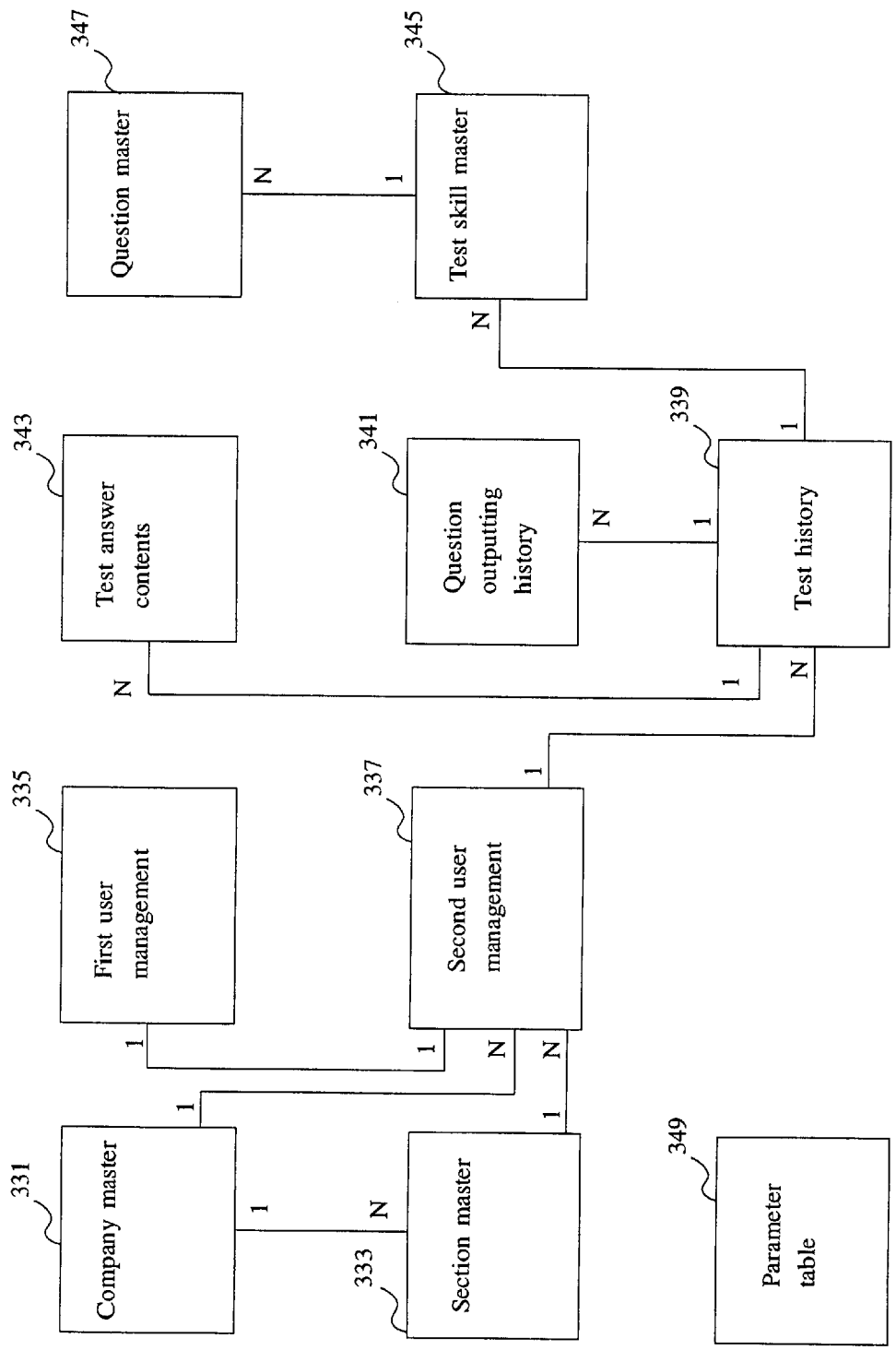
FIG. 2 is a diagram showing a relationship between databases (DBs) managed by a server.

FIG. 2 shows a relationship between each DB shown in FIG. 1. N section master DBs 333 are provided for one company master DB 331. In addition, N second user management DBs 337 are provided for one company master DB 331. N second user management DBs 337 are provided for one section master DB 333. Then, one first user management DB 335 is provided for one second user management DB 337. In addition, N test history DBs 339 are provided for one second user management DB 337.

N test answer contents DBs 343 are provided for one test history DB 339. In addition, N question outputting history DBs 341 are provided for one test history DB 339. Furthermore, N test skill master DBs 345 are provided for one test history DB 339. N question master DBs 347 are provided for one test skill master DB 345. There is no relationship between a parameter table DB 349 and other DBs.

Next, data stored in the company master DB 331 is explained using FIG. 3. The company master DB 331 is a database, which stores company information for each company. The company master DB 331 stores a company code, which is a key (abbreviated designation: compno, attribute: char(8) (character type), this item is not null (NotNull)), a company name (abbreviated designation: compnm, attribute: varchar2(50) (variable length character type), this item is not null (NotNull)), a headquarters address (abbreviated designation: comp address, attribute: varchar2(40)), a representative telephone number(TEL) (abbreviated designation: comptelno, attribute: varchar2(15)), and a representative facsimile number (abbreviated designation: compfaxno, attribute: varchar2(15)). This DB 331 is provided on the assumption that a person who will take the adaptive test is an employee in the registered company. Since this has no relationship with the main part of this embodiment, no further explanation is given.

Data stored in the section master DB 333 is explained in FIG. 4. The section master DB 333 is a database, which stores information regarding each company section. The section master DB 333 stores a company code, which is a key (abbreviate designation: compno, attribute: char(8), this item is not null (NotNull)), a section code, which is a key (abbreviate designation: groupno, attribute: char(8), this item is not null (NotNull)), a section name (abbreviated designation: groupnm, attribute: varchar2(40)), a section address (abbreviated designation: groupaddr, attribute:

varchar2(40)), a telephone number (abbreviated designation: grouptelno, attribute: varchar2(15)), and a facsimile number (abbreviated designation: groupfaxno, attribute: varchar2(15)). The DB 333 is provided on the assumption that a person who will take the adaptive test is an employee in the registered company and belongs to an arbitrary section in the registered company. Since this has no relationship with the main part of this embodiment, no further explanation is given.

Data stored in the first user management DB 335 is explained in FIG. 5. The first user management DB 335 is provided for each user and is used, for example, at the login. That is, if a user accesses to the server 3 by using the user terminal 5, a verification processing is performed by a user ID and password stored in the DB 335 and a user ID and password input. Since the verification processing has no relationship with the main part of this embodiment, no further explanation is given. The first user management DB 335 stores a user ID, which is a key (abbreviated designation: account, attribute: varchar2(25), this item is not null (NotNull)), an insider user ID, which is, a key (abbreviated designation: id, attribute: long (long integer type), this item is not null (NotNull)), a password (abbreviated designation: password, attribute: varchar2(50), this item is not null (NotNull)), an E-mail address (abbreviated designation: email, attribute: varchar2(50), this item is not null (NotNull)), a name (kanji) (abbreviated designation: namekj, attribute: varchar2(255)), a name (Kana) (abbreviated designation: namekn, attribute: varchar2(100)), a mail send flag, in which "0" means no mail is transmitted, and "1" means a mail is transmitted (abbreviated designation: mail_send_flag, attribute: smallint (short integer type), this item is not null (NotNull)), and a delete flag, in which "0" means it is not deleted, and "1" means it is deleted (abbreviated designation: del flag, attribute: smallint, this item is not null (NotNull)).

Data stored in the second user management DB 337 is explained using FIG. 6. The second user management DB 337 is provided for each user and is used, for example, when an authority check is necessary. That is, if the user accesses the server 3 by using the user terminal 5, the DB 337 is referenced and the authority of the user is confirmed. Since the authority confirmation processing has no relationship with the main part of this embodiment, no further explanation is given. The second user management DB 337 stores an inside user ID, which is a key (abbreviated designation: id, attribute: long, this item is not null (NotNull)), a registered date (abbreviated designation: reg_date, attribute: date, this item is not null (NotNull)), a last login date (abbreviated designation: last-login, attribute: date, this item is not null (NotNull)), an authority, which may be 1, 2, 3 or 4 (abbreviated designation: admin, attribute: smallint, this item is not null (NotNull)), a company code (abbreviated designation: compno, attribute: char(8)), and a section code (abbreviated designation: groupno, attribute: char(8)). "1" in the authority represents an administrator, and he or she can perform user management (registration, update, delete) and test question opening management. "2" in the authority represents a question author, and he or she can create, update, and delete test questions. "3" in the authority represents a user, and he or she can take a test, display the result and change his or her own password. "4" in the authority represents a course administrator, and he or she can display test results of employees in the company (for each person, or for each company) and change his or her own password.

Data stored in the question master DB 347 is explained using FIG. 7. The question master DB 347 is a database storing questions for tests. After the test questions are opened, this DB 347 is copied as another DB, and the version number is added. In addition, as a test implementation result, the number of solvers and the number of solvers who return the correct answer, is also stored. The question master DB 347 stores a skill category code, which is a key (abbreviated designation: skill_code, attribute: char(6), this item is not null (NotNull)), a version number (abbreviated designation: edit-no, attribute: smallint, this item is not null (NotNull)), a question number (No) (abbreviated designation: prob_no, attribute: smallint, this item is not null (NotNull)), a question statement (abbreviated designation: prob_stat, attribute: long varchar2(400), this item is not null (NotNull)), the number of choices (in this example, it is fixed to 4) (abbreviated designation: choice_no, attribute: smallint, this item is not null (NotNull)), a first choice (abbreviated designation: choice-1, attribute: varchar2(255), this item is not null (NotNull)), a second choice (abbreviated designation: choice-2, attribute: varchar2(255), this item is not null (NotNull)), a third choice (abbreviated designation: choice-3, attribute: varchar2(255), this item is not null (NotNull)), a fourth choice (abbreviated designation: choice-2, attribute: varchar2(255), this item is not null (NotNull)), a right answer (in the example, either of 1, 2, 3 or 4) (abbreviated designation: correct, attribute: smallint, this item is not null (NotNull)), an object of the study (abbreviated designation: skill, attribute: varchar2(50), this item is not null (NotNull)), a memo (abbreviated designation: memo, attribute: varchar2 (50)), a registered date (abbreviated designation: auth_date, attribute: date, this item is not null (NotNull)), a first difficulty parameter, (abbreviated designation: difficultyI, attribute: float (real number type), this item is not null (NotNull)), a second difficulty parameter (abbreviated designation: difficulty2, attribute: float), a third difficulty parameter (abbreviated designation: difficulty3, attribute: float), and a time limit for answer (second) (abbreviated designation: limit-time, attribute: int (integer type), this item is not null (NotNull)). The difficulty parameter is used for the ability value calculation and difficulty calculation and at least one difficult parameter is required.

Data stored in the test skill master DB 345 is explained using FIG. 8. The test skill master DB 345 is a database for managing the test questions. After the test questions are opened, the DB 345 is copied as another DB, and the version number is settled. In this example, one or higher number is set to the version number for the opened DB. The test skill master DB 345 stores a skill category code, which is a key (abbreviated designation: skill-code, attribute: varchar2(6), this item is not null (NotNull)), a version number, which is a key (abbreviated designation: edit-no, attribute: smallint, this item is not null (NotNull)), a skill category name (abbreviated designation: category_name, attribute: varchar2(80), this item is not null (NotNull)), a test period (minute) (abbreviated designation: course-time, attribute: smallint, this item is not null (NotNull)), an introduction (explanation) of the test (abbreviated designation: course_exp, attribute: long varchar2(400)), a registered date (abbreviated designation: course_regdate, attribute: date, this item is not null (NotNull)), a registering author (abbreviated designation: course-author, attribute: varchar2 (50) this item is not null (NotNull)),a open(0)/close(1) flag (abbreviated designation: course-release, attribute: smallint (0/1), this item is not null (NotNull)), the number of questions (abbreviated designation: course_probno, attribute: smallint, this item is not null (NotNull)), and the number of objects of the study (abbreviated designation: course_skillno, attribute: smallint, this item is not null (NotNull)).

Data stored in the test history DB 339 is explained using FIG. 9. The test history DB 339 is a database for storing the test implementation results. The test history DB 339 stores a skill category code, which is a key (abbreviated designation: skill-code, attribute: varchar2(6), this item is not null (NotNull)), a version number, which is a key (abbreviated designation: edit-no, attribute: smallint, this item is not null (NotNull)), a skill category inside code, which is a key (abbreviated designation: skill-id, attribute: varchar2(8), this item is not null (NotNull)), a user ID, which is a key (abbreviated designation: prob_user, attribute: varchar2(25), this item is not null (NotNull)), a test date (abbreviated designation: prob_date, attribute: date, this item is not null (NotNull)), a test time (abbreviated designation: prob_time, attribute: time, this item is not null (NotNull)), a flag representing answering (0) or has answered (1) (abbreviated designation: answer_flag, attribute: smallint, this item is not null (NotNull)), a point (the number of correct answers) (abbreviated designation: prob_point, attribute: smallint), the number n of questions (abbreviated designation: no_prob, attribute: smallint), an ability value (abbreviated designation: score, attribute: float, this item is not null (NotNull)), a cumulated rest time' period (second) (abbreviated designation: rest-time, attribute: int, this item is not null (NotNull)), a flag representing whether or not a time period added to the time limit set for the first question is reduced from the cumulated rest time period (abbreviated designation: add_1time_flag, attribute: int), a flag for the initial test for distinguishing solvers (abbreviated designation: init_test_flag, attribute: int), an ability value with time limit (abbreviated designation: result_init_on, attribute: float), and an ability value without time limit (abbreviated designation: result_init_off, attribute: float). As to the flag representing whether or not the time period added to the time limit set for the first question is reduced from the cumulated rest time period, "1" means that time period has already been reduced, and "0" means that time period has not been reduced yet. As to the flag for the initial test for distinguishing solvers, "0" means the initial test is not performed, "1" means the initial test is ongoing, and "2" means the initial test has completed.

Data stored in the test answer contents DB 343 is explained using FIG. 10. The test answer contents DB 343 stores a skill category code, which is a key (abbreviated designation: skill_code, attribute: varchar2(6), this item is not null (NotNull)), a version number, which is a key (abbreviated designation: edit-no, attribute: smallint, this item is not null (NotNull)), a skill category inside code, which is a key (abbreviated designation: skill-id, attribute: varchar2(8), this item is not null (NotNull)), a user ID, which is a key (abbreviated designation: prob_user, attribute: varchar2(25), this item is not null (NotNull)), a question number, which is a key (abbreviated designation: prob_no, attribute: smallint, this item is not null (NotNull)), an answer (abbreviated designation: answer, attribute: smallint), and an indication representing true or false (abbreviated designation: true-false, attribute: smallint).

Data stored in the question outputting history DB 341 is explained using FIG. 11. The question outputting history DB 341 is used to manage output questions to randomly output questions to solvers. The question outputting history DB 341 stores a skill category code, which is a key (abbreviated designation: skill_code, attribute: varchar2(6), this item is not null (NotNull)), a version number, which is a key (abbreviated designation: edit-no, attribute: smallint, this item is not null (NotNull)), a skill category inside code, which is a key (abbreviated designation: skill-id, attribute: varchar2(8), this item is not null (NotNull)), a user ID, which is a key (abbreviated designation: prob_user, attribute: varchar2(25), this item is not null (NotNull)), a test date, which is a key (abbreviated designation: test-date, attribute: date, this item is not null (NotNull)), a test time, which is a key (abbreviated designation: test time, attribute: time, this item is not null (NotNull)), a sequence number, which is a key (abbreviated designation: seq_no, attribute: int, this item is not null (NotNull)), a question number (No) (abbreviated designation: ques no, attribute: int, this item is not null (NotNull)), and a right answer (abbreviated designation: answercourse_name, attribute: char, this item is not null (NotNull)).

Data stored in the parameter table DB 349 is explained using FIG. 12. The parameter table DB 349 stores an added time period (abbreviated designation: add_ltime, attribute: int, this item is not null (NotNull)), a processing mode in the initial test for distinguishing solvers (abbreviated designation: init test mode, attribute: int), the maximum number of output questions in the initial test for distinguishing solvers (abbreviated designation: init test max, attribute: int), the maximum number of output questions (abbreviated designation: test_max, attribute: int), a pressure threshold (abbreviated designation: bound-press, attribute: float), a convergence error at the ability calculation (abbreviated designation: bound-margin, attribute: float), and a difficulty when the initial difficulty for questions is not set (abbreviated designation: init_difficult, attribute: float). As to a processing mode in the initial test for distinguishing solvers, "0" means the initial test is not executed, "1" means the time display or notification is performed, and "2" means the measurement of the time period is performed.

Processing flows in a system using such kinds of databases are explained using FIG. 13 to FIG. 21. In this embodiment, firstly, the initial test for distinguishing the solvers is performed by the program 311 for the initial test for distinguishing solvers (step S1). The initial test for distinguishing solvers is a test to judge whether or not a solver of the adaptive test is weak under the pressure of a time limit. Then, it is judged from the result of the initial test for distinguishing solvers whether or not a solver is weal in the pressure of the time limit (step S3). This judgment is performed by comparing the pressure threshold stored in the parameter table DB 349 with a difference between an ability value without the pressure and the ability value with the pressure.

If the difference between the ability value with the pressure and the ability value without the pressure is higher than the pressure threshold, it is judged that the solver is weak under the pressure. Then, the time limit cumulating type adaptive test described later is performed by the program 313 for the time limit cumulating type adaptive test (step S5). On the other side, if the difference between the ability value with the pressure and the ability value without the pressure is equal to or lower than the pressure threshold, the normal adaptive test is performed by the program 314 for the normal type adaptive test (step S7). Then, after the step S5 or step S7, the test result displaying program 327 notifies the solver of the result of the ability evaluation (step S9).

Figure 14:
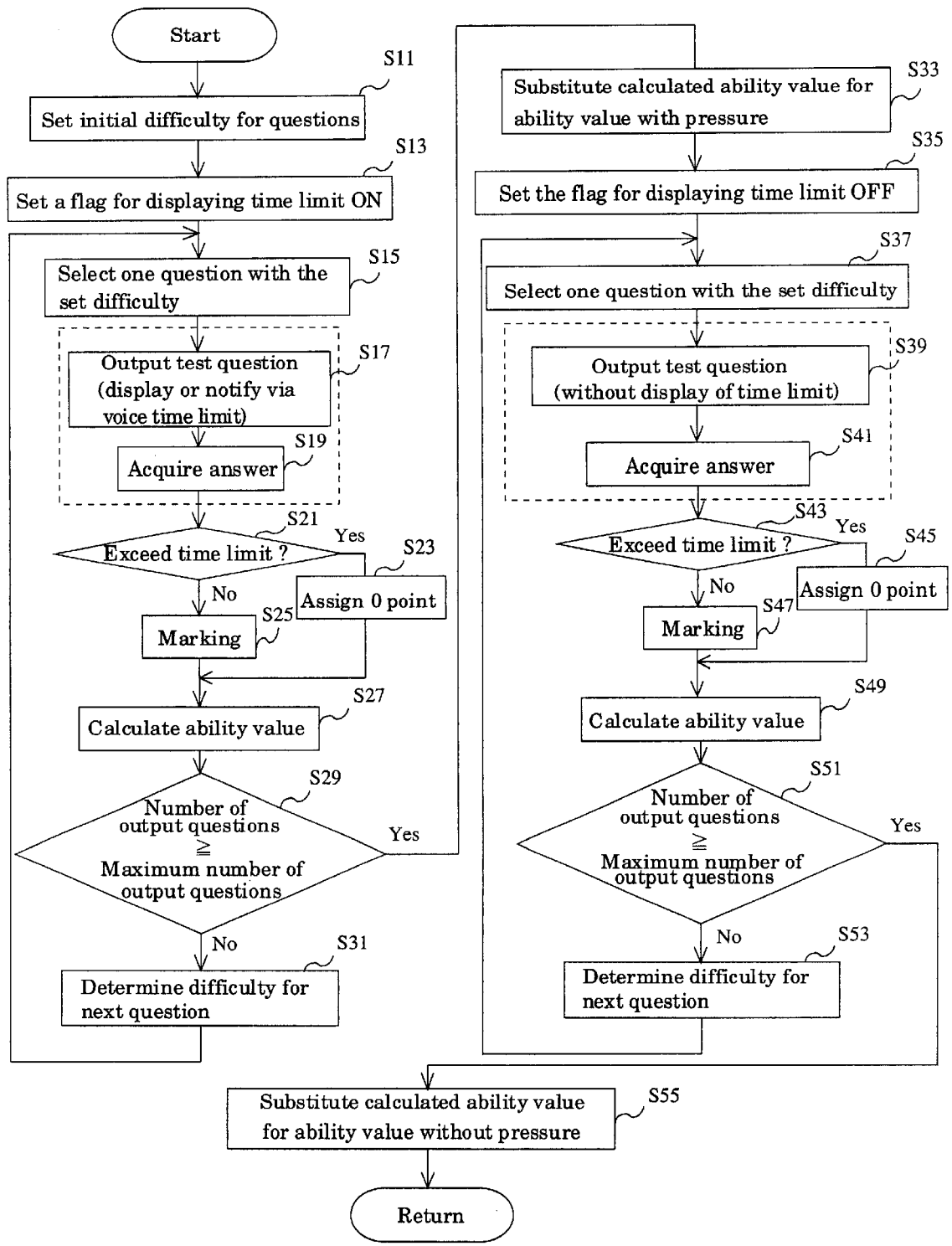
FIG. 14 is a flowchart of a first example of a processing flow of an initial test for distinguishing solvers.

Next, the first example of the processing flow of the program 311 for the initial test for distinguishing solvers is explained using FIG. 14. Before the processing flow begins, the server 3 makes the skill selecting program 325 prompt a solver who operates the user terminal 5 to select a skill field (a skill category) for the ability examination. That is, the skill selecting program 325 transmits information including choices of the skill fields to the user terminal 5, and the user terminal 5 receives and displays on a display the choices of the skill fields. Then, the solver looks at the display and selects a skill field. In response to the selection, the user terminal 5 transmits information regarding the selected skill field to the server 3. The skill selecting program 325 receives the information regarding the selected skill field and settles the skill field for questions that will be output to the solver. In addition, the skill selecting program 325 may prompt the solver who operates the user terminal 5 to select not only the skill field, but also a skill level. That is, the skill selecting program 325 transmits information including choices of the skill levels to the user terminal 5, and the user terminal 5 receives and displays the choices of the skill levels. Then, the solver looks at the display and selects a skill level. In response to the selection, the user terminal 5 transmits information regarding the selected skill field to the server 3. The skill selecting program 325 receives the information regarding the selected skill field, and settles an initial difficulty for questions, which will be output, according to the received information.

Next, the program 311 for the initial test to distinguish the solvers firstly sets the initial difficulty for questions (step S11). For example, if the solver selects the skill level through the skill selecting program 325, the initial difficulty for questions is determined according to the selection of the skill level. On the other side, if the solver has not selected the skill level, the program 311 gets the difficulty when the initial difficulty for questions is not set, which is stored in the parameter table DB 349. Next, in case of the first example of the processing flow, a flag for the time limit display ("1" and "2" in the processing mode in the initial test for distinguishing solvers (parameter table DB 349)) is set ON (step S13). Then, the test question selecting routine 323 selects the question with the difficulty, which has been set (step S15). Here, the program 311 for the initial test to distinguish the solvers sets to the test history DB 339, a skill category code, a version number, a skill category inside code, a user ID, a test date, a test time, a flag representing the solver is answering, a flag for the initial test for distinguishing solvers and etc. In addition, at this time, it is possible to register the similar information into the question outputting history DB 341.

After that, the program 311 for the initial test to distinguish the solvers transmits via the network 1 to the user terminal 5, information regarding the selected question (information in the question master DB 347 and the test skill master DB 345) and an applet to display the time or to notify the time via voice (step S17). Thus, the time is notified via display or voice to the solver, and the pressure of the time limit is given clearly. Then, the solver operates the user terminal 5 under such an environment and inputs an answer, and the user terminal 5 transmits the input answer to the server 3. Then, the program 311 for the initial test for distinguishing solvers in the server 3 acquires the answer by the solver (step S19).

Figure 15:
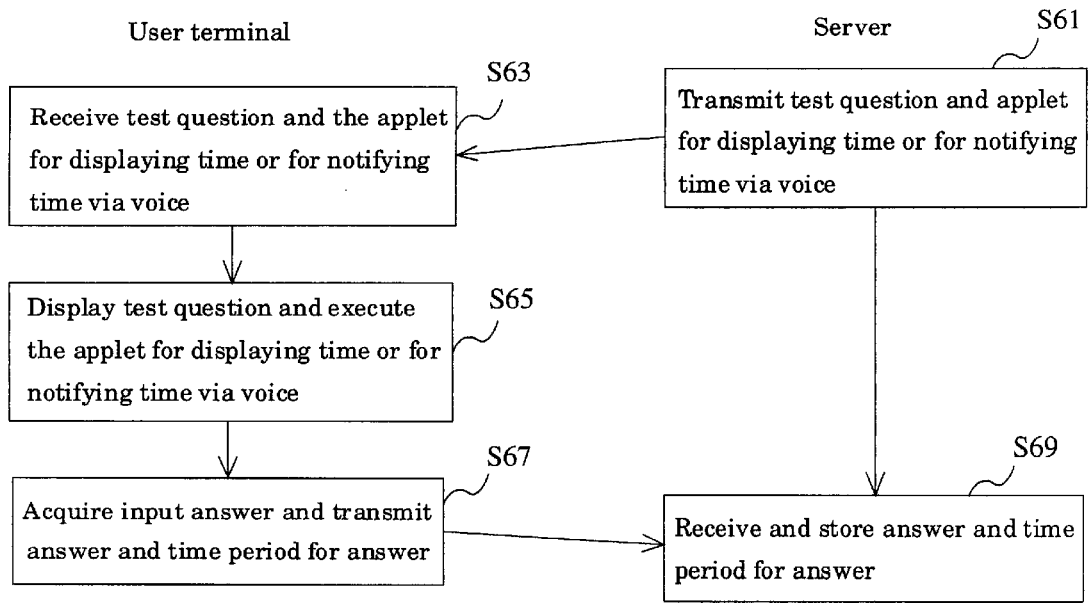
FIG. 15 is a flowchart showing a transaction (first case) between a server and a user terminal when a test question is given to the solver and answered by the solver.
Figure 16:
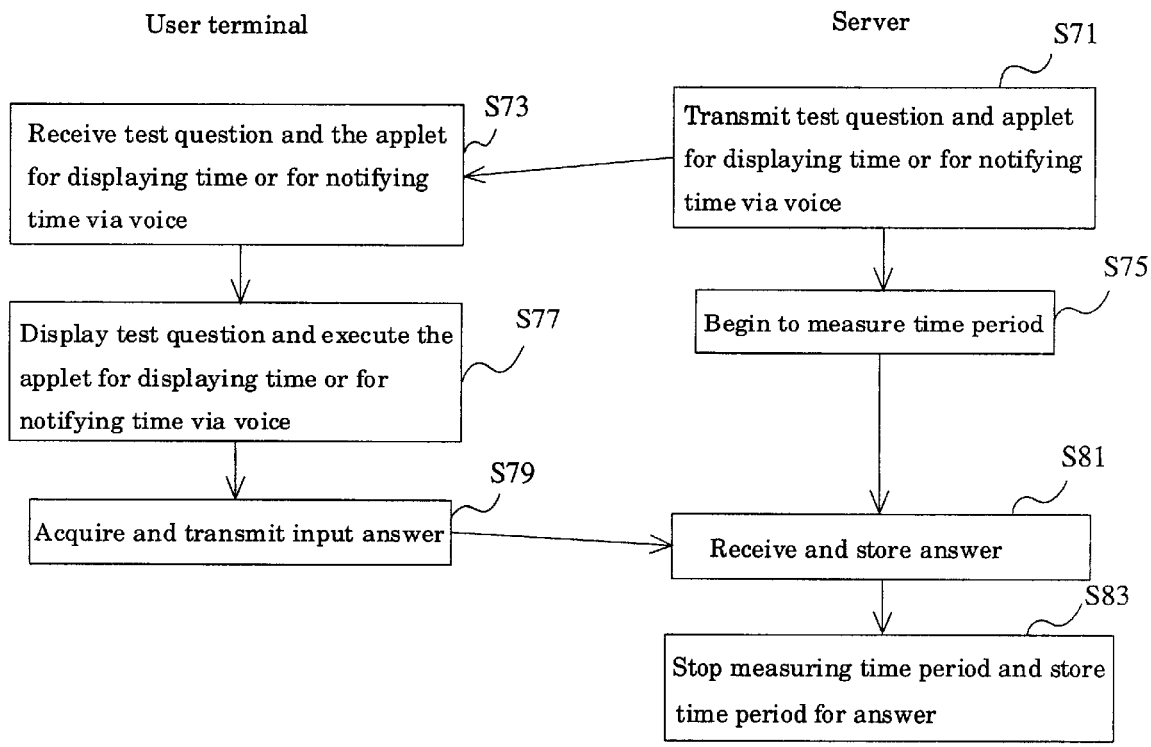
FIG. 16 is a flowchart showing a transaction (second case) between a server and a user terminal when a test question is given to the solver and answered by the solver.

Step S17 and step S19 are explained using FIG. 15 and FIG. 16. FIG. 15 indicates transactions between the server 3 and the user terminal 5 during the step S17 and step S19. The program 311 for the initial test to distinguish the solvers in the server 3 transmits to the user terminal 5 of the solver information of a test question and an applet to display the time or to notify the time via voice (step S61). In response, the user terminal 5 receives the information of the test question and the applet to display the time or to notify the time via voice (step S63), the question displaying program 53 (Web browser) displays the test question and executes the applet to display the time or to display the time via voice (step S65). In this case, the applet to display the time or to notify the time via voice is the time watching program 53. The applet to display the time or to notify the time via voice measures a time period from the display of the test question and notifies the time period via display or voice. In addition, the time limit itself may be displayed. The applet may notify a rest time period, which is calculated by subtracting the time elapsed from the display of the test question from the time limit for that test question. Therefore, the applet to display the time or to notify the time via voice can grasp the time period for the answer from the display of the test question until the solver inputs his or her answer and instructs the user terminal 5 to transmit the answer.

Then, when the solver inputs his or her answer, the answer transmitting program 51 (Web browser) in the user terminal 5 gets information regarding the answer and gets the time period for the answer from the applets for displaying time or for notifying time via voice. Then, the program 51 transmits the information regarding the answer and the time period for the answer to the server 3 (step S67). The program 311 for the initial test to distinguish the solvers in the server 3 gets from the user terminal 5 the information regarding the answer and the time period for the answer (step S69).

FIG. 15 shows an example in which the communication time period through the network 1 is not fixed and cannot be predicted. If the system is in an environment in which the communication time period through the network 1 can be ignored, a processing such as shown in FIG. 16 is performed. The program 311 for the initial test to distinguish the solvers in the server 3 transmits information of the test question and the applet to display the time or to notify the time via voice to the user terminal 5 of the solver (step S71). In addition, the program 311 for the initial test to distinguish the solvers begins to measure the time period (step S75). In response, the user terminal 5 receives from the server 3, the information of the test question and the applet to display the time or to notify the time via voice (step S73), the question displaying program 53 (Web browser) displays the test question on the display and executes the applet to display the time or to notify the time via voice (step S77). Then, the solver looks at the displayed test question and inputs an answer. Then, the answer transmitting program 51 (Web browser) gets information regarding the answer and transmits to the server 3, the information regarding the answer (step S79). In an example of FIG. 16, the applet to display the time or to notify the time via voice performs only processing to display the time on the display of the user terminal 5 or to notify the time via voice. The program 311 for the initial test to distinguish the solvers in the server 3 receives the information regarding the answer from the user terminal 5 and stores the information into a storage device (step S81). In addition, the program 311 stops the time measurement, which began at step S75, and stores the measured time period for the answer into a storage device (step S83). After such a processing, the processing flow returns to FIG. 14.

The program 311 for the initial test to distinguish the solvers in the server 3 refers to the time period for the answer and judges whether or not the time period for the answer is over the time limit set for the output question (the time limit for answer in the question master DB 347) (step S21). If the time period for the answer is over the time limit, a point is set "0" without performing a marking processing (step S23). On the other hand, if the time period for the answer does not exceed the time limit, the marking routine 321 refers to the right answer in the question master DB 347 and the information regarding the answer stored in the storage device and the marking routine 321 performs a marking processing (step S25). Here, the program 311 for the initial test to distinguish the solvers registers to the test answer contents DB 343 and the question outputting history DB 341 the result of the marking and the contents of the test implementation. In addition, the data regarding the point and the number of questions and so on in the test history DB 339 is changed.

Then, the ability value calculating routine 317 performs the calculation of the ability from the result of the marking (step S27). The calculated ability value is stored in "the ability value" column in the test history DB 339. The calculation of the ability is not changed from conventional methods. Therefore, further explanation is omitted. However, the difficulty parameter stored in the question master DB 347 is used for the calculation of the ability. Then, it is confirmed whether or not the number of output questions up to this point is equal to or higher than the maximum number of output questions in the initial test to distinguish the solvers (the maximum number of output questions in the initial test to distinguish the solvers in the parameter table DB 349) (step S29). If the number of output questions is lower than the maximum number of output questions in the initial test for distinguishing solvers, the program 311 for the initial test to distinguish the solvers determines the difficulty for the next question based on the ability value calculated at the step S27 (step S31). That is, if the ability value becomes higher, the difficulty is made higher. If the ability value becomes lower, the difficulty is made lower. The processing is the same as in conventional arts. Therefore, further explanation is omitted. Then, the processing flow returns to step S15.

On the other hand, if the number of output questions is equal to or higher than the maximum number of output questions in the initial test for distinguishing solvers, the program 311 completes the ability value calculation if the pressure of the time limit is given clearly and substitutes the ability value calculated at step S27 for "the ability value with pressure" and also registers it into "the ability value with time limit" column in the test history DB 339 (step S33).

Next, a test is performed so that the pressure of the time limit is not given clearly. Therefore, a flag for the time limit display (only "1" in the processing mode in the initial test for distinguishing solvers in the parameter table DB 349) is set OFF (step S35). Then, the test question selecting routine 323 selects a question with the set difficulty (step S37). The set difficulty may be a difficulty, which is changed at the step S31, or may be initialized into the initial value. Here, the program 311 for the initial test for distinguishing solvers sets to the test history DB 339, a skill category code, a version number, a skill category inside code, a user ID, a test date, a test time, a flag representing the solver is answering, a flag for the initial test to distinguish the solvers and etc. In addition, at this time, it is possible to register the similar information into the question outputting history DB 341.

After that, the program 311 for the initial test to distinguish the solvers transmits via the network 1 to the user terminal 5, information regarding the selected question (information in the question master DB 347 and the test skill master DB 345) and an applet for measuring time without display of the time (step S39). At this time, time is not notified to the solver who operates the user terminal 5, and the pressure of the time limit is not given. Then, the solver operates the user terminal 5 under such an environment and inputs an answer. The user terminal 5 transmits the input answer to the server 3. Then, the program 311 for the initial test to distinguish the solvers gets the answer from the solver (step S41).

Figure 17:
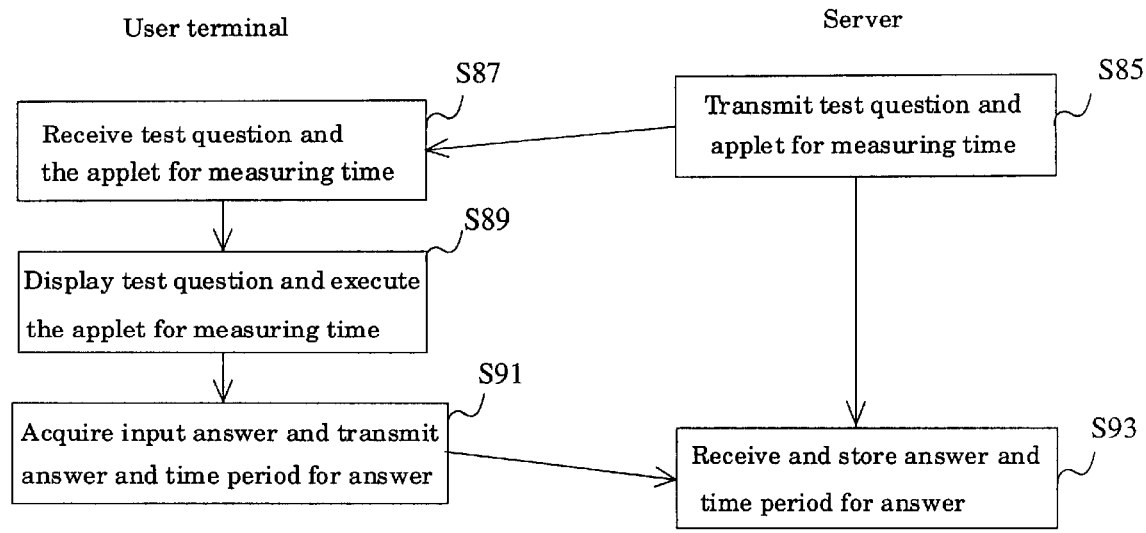
FIG. 17 is a flowchart showing a transaction (third case) between a server and a user terminal when a test question is given to the solver and answered by the solver.

Step S39 and step S41 is explained using FIG. 17. FIG. 17 indicates transactions between the server 3 and the user terminal 5 during the step S39 and step S41. The program 311 for the initial test to distinguish the solvers transmits information of the test question and an applet for measuring time to the user terminal 5 of the solver (step S85). In response to this, the user terminal 5 receives the information of the test question and the applet for measuring time (step S87), and the question displaying program 53 (Web browser) displays on a display, the test question, and the applet for measuring time is executed (step S89). This applet for measuring time is a time watching program 55 in this case. The applet to measure the time does measure a time period from the display of the test question, but does not notify time via display or voice. The applet to measure the time measures the time period from the display of the test question until the solver inputs an answer and instructs to send it to the server 3.

When the solver inputs the answer, the answer transmitting program 51 (Web browser) in the user terminal 5 gets information regarding the answer and gets the time period for the answer from the applets for measuring time. Then, the user terminal 5 transmits the information regarding the answer and the time period for the answer to the server 3 (step S91). The program 311 for the initial test to distinguish the solvers receives and stores into a storage device, the information regarding the answer and the time period for the answer from the user terminal 5 (step S93).

FIG. 17 shows an example in which the communication time period through the network 1 is not fixed and cannot be predicted. If this system is in an environment in which the communication time period through the network 1 can be ignored, as shown in FIG. 16, the time may be measured in the server 3.

Returning to FIG. 14, the program 311 for the initial test to distinguish the solvers in the server 3 refers to the time period for the answer and judges whether or not the time period for the answer is over the time limit set for the output question (the time period for answer in the question master DB 347) (step S43). If the time period for the answer is over the time limit, a point is set to 0 without performing a marking processing (step 845). On the other hand, if the time period for the answer does not exceed the time limit, the marking routine 321 refers to the right answer in the question master DB 347 and the information regarding the answer stored in the storage device and performs a marking processing (step S47). Here, the program 311 for the initial test to distinguish the solvers registers to the test answer contents DB 343 and the question outputting history DB 341, the result of the marking and contents of the test implementation. In addition, data regarding the point and the number of questions and so on in the test history DB 339 is changed.

Then, the ability value calculating routine 317 performs the calculation of the ability from the result of the marking (step S49). The difficulty parameter stored in the question master DB 347 is used for calculation of the ability. The calculated ability value is stored in "the ability value" column in the test history DB 339. Then, it is confirmed whether or not the number of output questions until here is equal to or higher than the maximum number of output questions in the initial test to distinguish the solvers (the maximum number of output questions in the initial test to distinguish the solvers in the parameter table DB 349) (step S51). If the number of output questions is lower than the maximum number of output questions in the initial test to distinguish the solvers, the program 311 for the initial test to distinguish the solvers determines the difficulty for the next question based on the ability value calculated at the step S27 (step S53). That is, if the ability value becomes higher, the difficulty is made higher. If the ability value becomes lower, the difficulty is made lower. Then, the processing flow returns to step S37.

On the other hand, if the number of output questions is equal to or higher than the maximum number of output questions in the initial test to distinguish the solvers, the program 311 completes the ability value calculation if the pressure of the time limit is not given clearly and substitutes the ability value calculated at step S49 for "the ability value without pressure" and also registers the ability value into "the ability value without time limit" column in the test history DB 339 (step S55). Then, processing returns to the processing flow (step S3) in FIG. 13.

As described above, in step S3, whether or not the pressure sensitivity to the time limit is high or low is determined based on whether the difference (pressure sensitivity) between the ability value without pressure and the ability value with pressure exceeds the pressure threshold in the parameter table DB 349.

Figure 18:
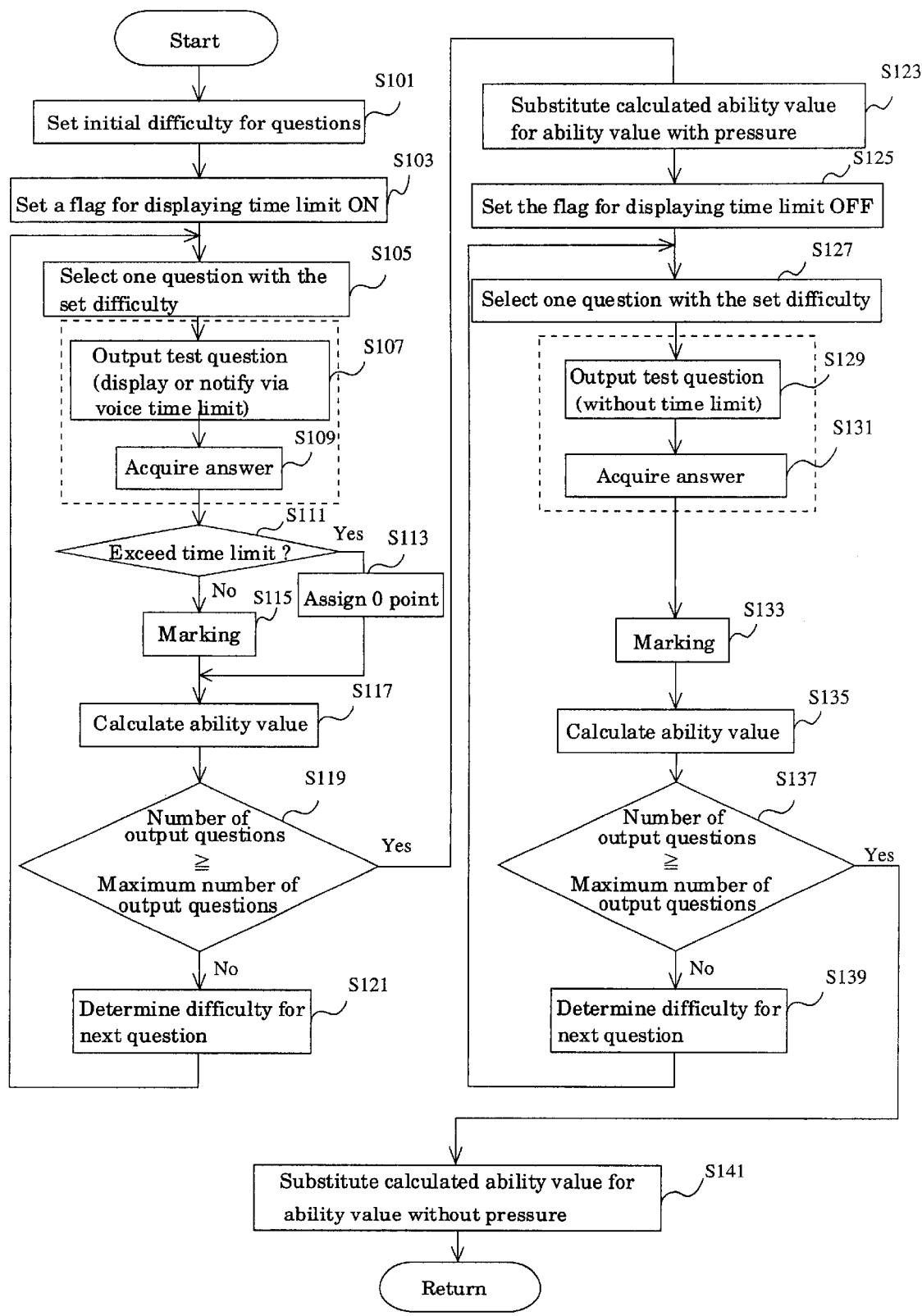
FIG. 18 is a flowchart of a second example of a processing flow of an initial test for distinguishing solvers.

Next, the second example of the processing flow of the program 311 for the initial test to distinguish the solvers is explained using FIG. 18. As described above, before the processing flow begins, the server 3 makes the skill selecting program 325 prompt a solver who operates the user terminal 5 to select a skill field for the ability examination. In addition, the skill selecting program 325 may prompt the solver who operates the user terminal 5 to select not only the skill field, but also a skill level. That is, the initial difficulty for questions, which will be output, may be settled according to the skill level selection by the solver.

Next, the program 311 for the initial test to distinguish the solvers firstly sets the initial difficulty for questions (step S101). For example, if the solver selects the skill level through the skill selecting program 325, the initial difficulty for questions is determined according to the selection of the skill level. On the other side, if the solver has not selected the skill level, the program 311 gets the difficulty when the initial difficulty for questions is not set, which is stored in the parameter table DB 349. Next, in case of the second example of the processing flow, a flag for the time limit display ("1" and "2" in the processing mode in the initial test to distinguish the solvers (parameter table DB 349)) is set ON (step S103). It is possible to set a flag for the time limit (only "2" in the processing mode in the initial test to distinguish the solvers (parameter table DB 349)) ON. Then, the test question selecting routine 323 selects a question with the difficulty, which has been set (step S105). Here, the program 311 for the initial test to distinguish the solvers sets to the test history DB 339, a skill category code, a version number, a skill category inside code, a user ID, a test date, a test time, a flag representing the solver is answering, a flag for the initial test to distinguish the solvers and etc. In addition, at this time, it is possible to register the similar information into the question outputting history DB 341.

After that, the program 311 for the initial test to distinguish the solvers transmits via the network 1 to the user terminal 5, the information regarding the selected question (information in the question master DB 347 and the test skill master DB 345) and the applet to display the time or to notify the time via voice (step S107). Thus, the time is notified via the display or the voice to the solver, and the pressure of the time limit is given clearly. If the flag for the time limit is set ON, the applet to measure the time is transmitted on behalf of the applet to display the time or to notify the time via voice. Then, the solver operates the user terminal 5 under such an environment and inputs an answer, and the user terminal 5 transmits the input answer and the time period for the answer, which is acquired from the applet to display the time or to notify the time via voice, to the server 3. Then, the program 311 for the initial test to distinguish the solvers in the server 3 gets the answer by the solver and the time period for the answer (step S109).

As to step S107 and step S109, a processing flow as shown in FIG. 15 or FIG. 16 is performed if the applet to display the time or to notify the time via the voice. If the applet to measure the time is transmitted, a processing flow as shown in FIG. 17 is performed. In case of FIG. 17, the time is measured at the user terminal 5, but it is possible to measure time at the server 3.

Returning to FIG. 18, the program 311 for the initial test to distinguish the solvers in the server 3 refers to the time period for the answer and judges whether or not the time period for the answer is over the time limit set for the output question (the time period for answer in the question master DB 347) (step S111). If the time period for the answer is over the time limit, a point is set to 0 without performing a marking processing (step S113). On the other hand, if the time period for the answer does not exceed the time limit, the marking routine 321 refers to the right answer in the question master DB 347 and the information regarding the answer stored in the storage device and performs a marking processing (step S115). Here, the program 311 for the initial test to distinguish the solvers registers to the test answer contents DB 343 and the question outputting history DB 341, the result of the marking and the contents of the test performance. In addition, the data regarding the point and the number of questions and so on in the test history DB 339 is changed.

Then, the ability value calculating routine 317 performs the calculation of the ability from the result of the marking (step S117). The difficulty parameter stored in the question master DB 347 is used for this calculation of the ability. The calculated ability value is stored in "the ability value" column in the test history DB 339. The calculation of the ability is not changed from conventional methods. Therefore, further explanation is omitted. Then, it is confirmed whether or not the number of output questions until here is equal to or higher than the maximum number of output questions in the initial test to distinguish the solvers (the maximum number of output questions in the initial test to distinguish the solvers in the parameter table DB 349) (step S119). If the number of output questions is lower than the maximum number of output questions in the initial test to distinguish the solvers, the program 311 for the in test to distinguish the solvers determines the difficulty for the next question based on the ability value calculated at the step S117 (step S121). That is, if the ability value becomes higher, the difficulty is made higher. If the ability value becomes lower, the difficulty is made lower. The processing is the same as in conventional arts. Therefore, further explanation is omitted. Then, the processing flow returns to step S105.

On the other hand, if the number of output questions is equal to or higher than the maximum number of, output questions in the initial test to distinguish the solvers, the program 311 completes the ability value calculation if the pressure of the time limit is given clearly and substitutes the ability value calculated at step 5117 for "the ability value with pressure" and also registers the ability value into "the ability value with time limit" column in the test history DB 339 (step S123).

Next, a test is performed so that the pressure of the time limit is not given clearly. Therefore, a flag for displaying the time limit ("1" and "2" in the processing mode in the initial test to distinguish the solvers in the parameter table DB 349) is set OFF (step S125). Then, the test question selecting routine 323 selects a question with the set difficulty (step S127). The set difficulty maybe a, difficulty, which is changed at the step S121, or may be initialized into the initial value. Here, the program 311 for the initial test to distinguish the solvers sets to the test history DB 339, a skill category code, a version number, a skill category inside code, a user ID, a test date, a test time, a flag representing the solver is answering, a flag for the initial test to distinguish the solvers and etc. In addition, at this time, it is possible to register the same information into the question outputting history DB 341.

After that, the program 311 for the initial test to distinguish the solvers transmits via the network 1 to the user terminal 5, information regarding the selected question (information in the question master DB 347 and the test skill master DB 345) (step S129). At this time, time is not notified to the solver who operates the user terminal 5, and also not measured. Therefore, the solver does not have to mind the time limit and can answer after sufficient consideration. Then, the solver operates the user terminal 5 under such an environment and inputs an answer. The user terminal 5 transmits the input answer to the server 3. Then, the program 311 for the initial test to distinguish the solvers gets the answer from the solver (step S131).

Figure 19:
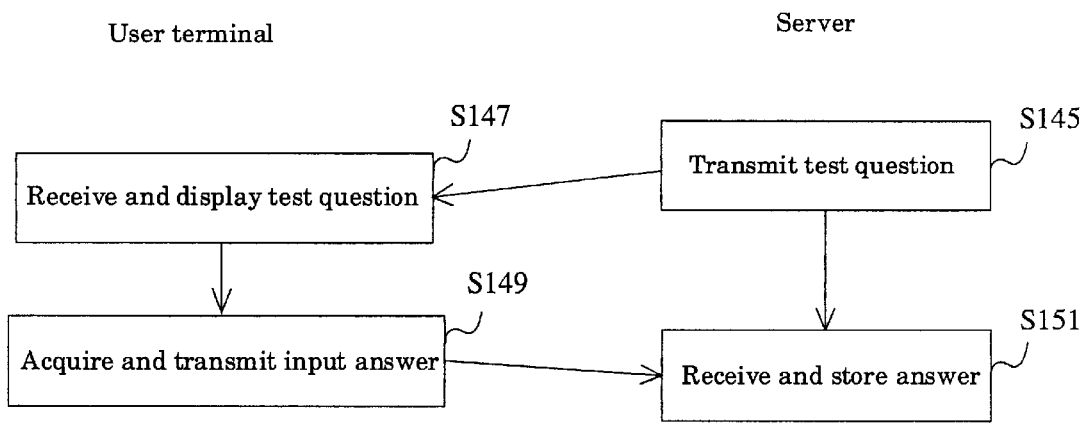
FIG. 19 is a flowchart showing a transaction (fourth case) between a server and a user terminal when a test question is given to the solver and answered by the solver.

Step S129 and step S131 is explained using FIG. 19. FIG. 19 indicates transactions between the server 3 and the user terminal 5 during the step 5129 and step S131. The program 311 for the initial test to distinguish the solvers transmits information of the test question (step S145). In response, the user terminal 5 receives the information of the test question, and the question displaying program 53 (Web browser) displays on a display, the test question (step S147). In this case, no applet is executed. When the solver inputs the answer, the answer transmitting program 51 (Web browser) in the user terminal 5 gets information regarding the answer, and the user terminal 5 transmits the information regarding the answer to the server 3 (step S149). The program 311 for the initial test to distinguish the solvers receives the information regarding the answer from the user terminal 5 and stores it into a storage device (step S151).

Returning to FIG. 18, the marking routine 321 in the server 3 refers to the right answer in the question master DB 347 and the information regarding the answer stored in the storage device and performs a marking processing (step S133). Here, the program 311 for the initial test to distinguish the solvers registers to the test answer contents DB 343 and the question outputting history DB 341, the result of the marking and contents of the test performance. In addition, the data regarding the point and the number of questions and so on in the test history DB 339 is changed.

Then, the ability value calculating routine 317 performs the calculation of the ability from the result of the marking (step S135). The difficulty parameter stored in the question master DB 347 is used for the calculation of the ability. The calculated ability value is stored in "the ability value" column in the test history DB 339. Then, it is confirmed whether or not the number of output questions, at this time, is equal to or higher than the maximum number of output questions in the initial test to distinguish the solvers (the maximum number of output questions in the initial test to distinguish the solvers in the parameter table DB 349) (step S137). If the number of output questions is lower than the maximum number of output questions in the initial test to distinguish the solvers, the program 311 for the initial test to distinguish the solvers determines the difficulty for the next question based on the ability value calculated at the step S135 (step S139). That is, if the ability value becomes higher, the difficulty is made higher. If the ability value becomes lower, the difficulty is made lower. Then, processing flow returns to step S127.

On the other hand, if the number of output questions is equal to or higher than the maximum number of output questions in the initial test to distinguish the solvers, the program 311 completes the ability value calculation if the pressure of the time limit is not given clearly and substitutes the ability value calculated at step S135 for "the ability value without pressure" and also registers the ability value into "the ability value without time limit" column in the test history DB 339 (step S141). Then, processing returns to a processing flow (step S3) in FIG. 13.

As described above, in step S3, whether or not the pressure sensitivity to the time limit is high or low is determined based on whether the difference (pressure sensitivity) between the ability value without the pressure and the ability value with the pressure exceeds the pressure threshold in the parameter table DB 349.

With this configuration, a person who is weak under the pressure of the time limit is distinguished.

Figure 13:
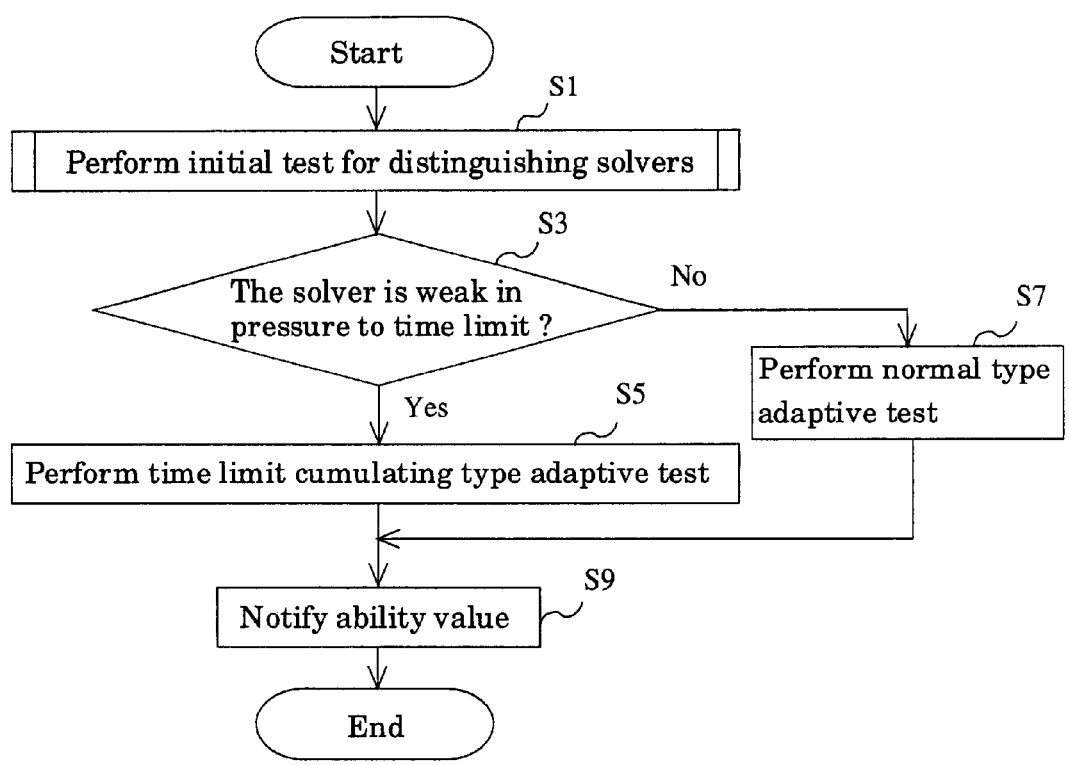
FIG. 13 is a flowchart of the main processing flow in an embodiment of the present invention.
Figure 20:
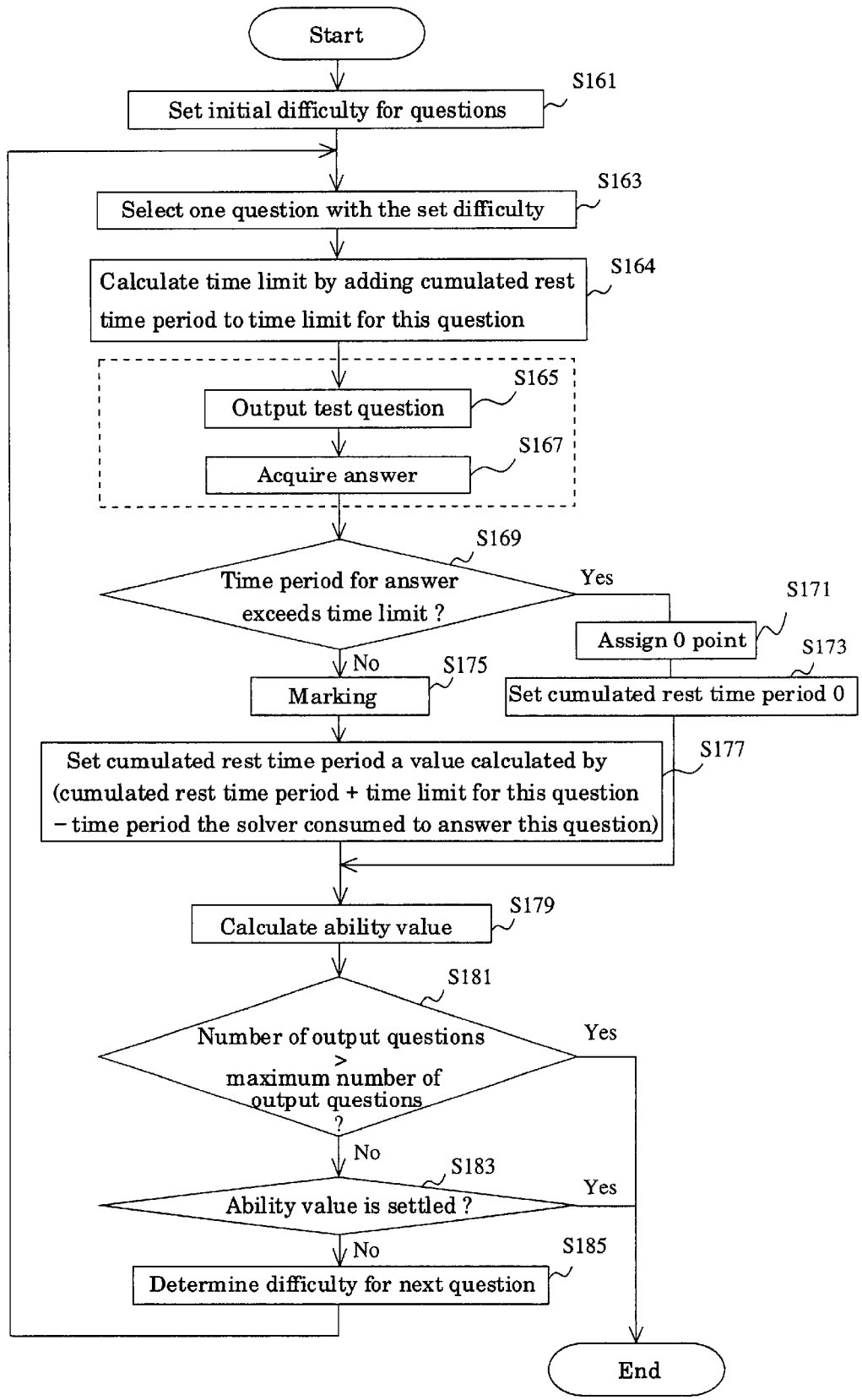
FIG. 20 is a flowchart of a first example of a processing flow of a time limit cumulative type adaptive test.
Figure 21:
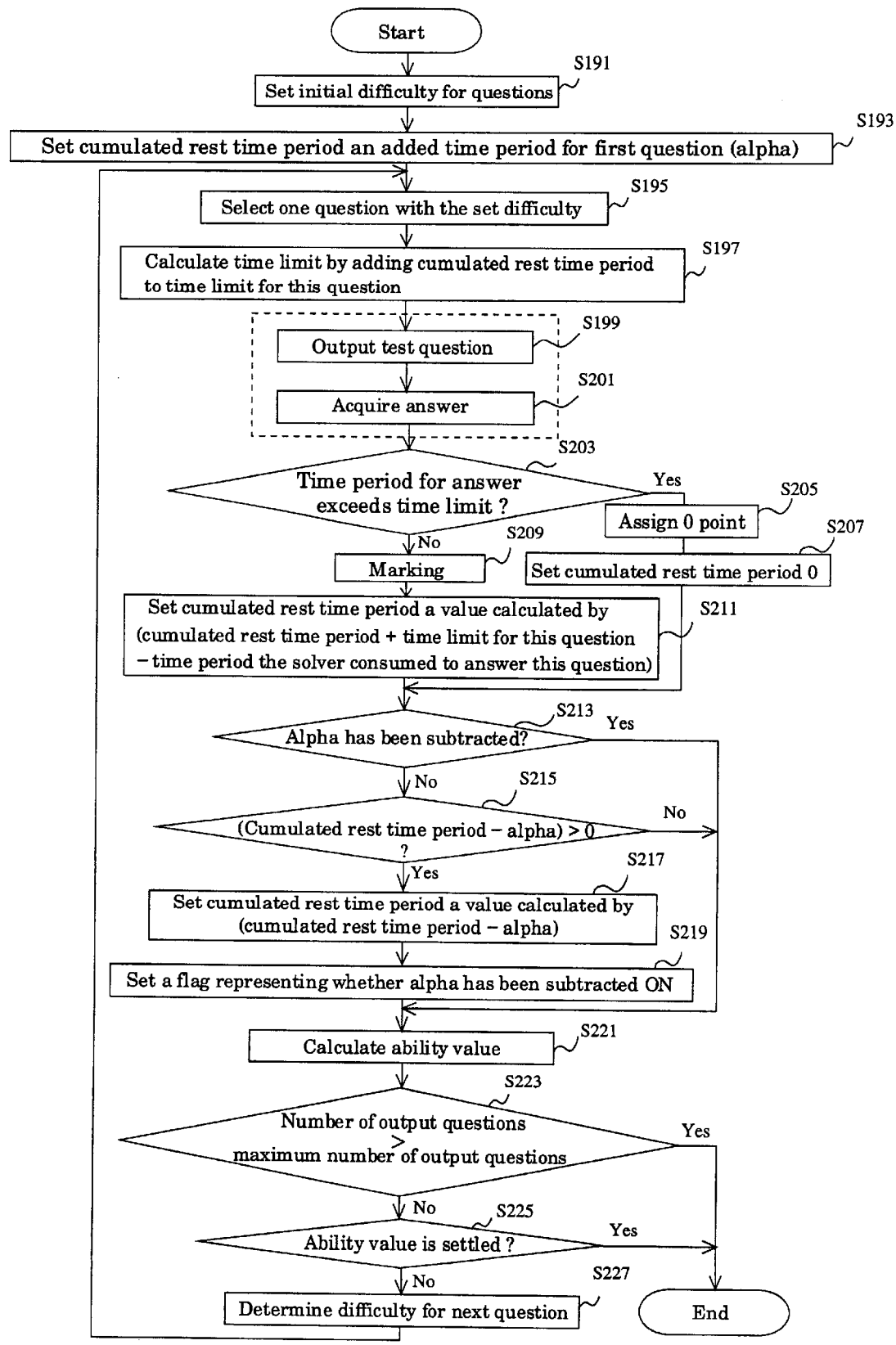
FIG. 21 is a flowchart of a second example of a processing flow of a time limit cumulating type adaptive test.

Next, the first example of a processing flow for step S5 (the time limit cumulating type adaptive test) in FIG. 13 is explained using FIG. 20. At First, the program 313 for the time limit cumulating type adaptive test performs a processing for setting an initial difficulty for questions (step S161). It is possible not to set the initial difficulty, but to use "the difficulty for next question" determined at step S53 in FIG. 14 or at step S139 in FIG. 18. In such a case, the time period necessary for the whole test is extended by performing the initial test to distinguish the solvers, but since the difficulty, which is near the ability of the solver, has already been calculated by the initial test to distinguish the solvers, it becomes possible to hasten the convergence of the ability value in the time limit cumulating type adaptive test. In addition, at this step, it is also possible to refer to the difficulty when the initial difficulty for questions in parameter table DB 349 and to set and use this difficulty. Furthermore, it is also possible to make the skill selecting program 325 prompt the solver who operates the user terminal 5 to select the skill level. In this case, the skill selecting program 325 transmits information including choices of the skill levels to the user terminal 5, and the user terminal 5 receives and displays on the display the choices for the skill levels. Then, the solver looks at the display and selects a skill level. In response to the selection, the user terminal 5 information regarding the selected skill level to the server 3. The skill selecting program 325 receives the information regarding the selected skill level and settles the initial difficulty for the questions, which will be output according to the received information.

Then, the test question selecting routine 323 selects a question with the set difficulty (step S163). Here, the program 313 for the time limit cumulating type adaptive test sets to the test history DB 339, a skill category code, a version number, a skill category inside code, a user ID, a test date, a test time, a flag representing the solver is answering, and etc. In addition, it is possible to register the similar information into the question outputting history DB 341.

Then, the time limit calculating routine 319 calculates the time limit at this time by (cumulated rest time period (cumulated rest time period in test history DB 339)+the time limit set for the question (the time limit for answer in the question master DB 347) (step S164). After that, the program 313 for the time limit cumulating type adaptive test transmits via the network 1 to the user terminal 5, information regarding the selected question (information in the question master DB 347 and the test skill master DB 345) (step S165). Then, the solver operates the user terminal 5 and inputs an answer. The user terminal 5 transmits the input answer to the server 3. The program 313 for the time limit cumulating type adaptive testin the server 3 receives the answer from the solver (step S167). The program 313 for the time limit cumulating type adaptive test transmits the applet to display the time or to notify the time via voice or the applet to measure the time with the information regarding the selected question. These steps 5165 and S167 are performed according to a processing flow shown in FIG. 15, FIG. 16 or FIG. 17. Information regarding the time period calculated at the step S164 may be set to the applet to display the time or to notify the time via voice, and the time limit may be notified to the solver by the display or via voice.

In the user terminal 5, following processing may be executed. That is, in response to receipt of information from the server 3, a first question and information regarding a time limit for the first question are displayed on the display device. Then, an answer for the first question is acquired from the solver. If the solver answered for the first question before the time limit for the first question, in response to receipt of the information from the server 3, a second question and information regarding a time period calculated by adding a time limit set for the second question to a rest of the time limit for the first question, are displayed on the display device.

In the user terminal 5, following processing may be executed. That is, in response to receipt of information from the server 3, a first question and time that can progress from a starting time to a time limit for the first question are displayed on the display device. Then, an answer for the first question is acquired from: a solver. If a solver answered for the first question before the time limit for the first question, in response to receipt of information from the server 3, a second question and time that can progress from a starting time to a time period calculated by adding a time limit set for the second question to a rest of the time limit for the first question are displayed on the display device.

The program 313 for the time limit cumulating type adaptive testin the server 3 judges whether the answer time period, which is received from the user terminal 5, for example, exceeds the time limit (the time limit for answer in the question master DB 347) (step S169). If the answer time period exceeds the time limit, 0 point is assigned (step S171), and 0, which is the cumulated rest time period, is registered into "cumulated rest time period" column in the test history DB 339 (step S173). If the answer time period does not exceed the time limit, the marking routine 321 refers to the right answer in the question master DB 347 and the answer information stored in the storage device and performs marking (step S175). Here, the program 313 for the time limit cumulating type adaptive test registers to the test answer contents DB 343 and the question outputting history DB 341, the result of the marking and contents of the test implementation. In addition, data regarding the point and the number of questions and so on in the test history DB 339 is changed.

Then, the time limit calculating routine 319 refers to the cumulated rest time period in the test history DB 339 and the time limit for answer in the question master DB 347, and calculates (the cumulated rest time period+the time limit set for the question−time period consumed for the question (the time limit for answer)), then registers the calculation result into "the cumulated rest time period" column in the test history DB 339, again (step S177). (The cumulated rest time period+the time limit set for the next question) becomes the time limit for the next question.

Next, the ability value calculating routine 317 calculates the ability value from the marking result (step S179). The calculated ability value is stored in "the ability value" column in the test history DB 339. The difficulty parameter stored in the question master DB 347 is used for the calculation of the ability. Then, it is confirmed whether or not the number of output questions until here is equal to or higher than the maximum number of output questions in the time limit cumulating type adaptive test (the maximum number of output questions in the initial test to distinguish the solvers in the parameter table DB 349) (step S181). If the number of output questions is equal to or lower than the maximum number of output questions in the time limit cumulating type adaptive test, the program 313 for the time limit cumulating type adaptive test judges whether or not the ability value calculated at the step S179 converges and whether the ability value is in the settlement state (step S183). The judgment whether or not the ability value is in the settlement state is performed based on the value of the convergence error at the ability value calculation in the parameter table DB 349. That is, if a difference between the standard deviation of the ability value newly calculated at the step S179 and the standard deviation of the previous ability value is less than the convergence error, the ability value newly calculated at the step S179 indicates the settlement state, and the processing flow completes. In this case, the standard deviation represents a degree of the dispersion of the ability values (estimated values). The ability value calculated at the step 5179 just before is an ability value for the solver. On the other hand, if it is judged that the ability value is not in the settlement state, the difficulty for the next question is determined based on the ability value calculated at the step S179 (step S185). That is, if the ability value becomes higher, the difficulty is made higher. If the ability value becomes lower, the difficulty is made lower. Then, the processing flow returns to step S163.

On the other hand, if the number of output questions exceeds the maximum number of output questions in the time limit cumulating type adaptive test, the processing ends. The ability value calculated at the step S179 just before is an ability value for the solver.

By performing such a processing, the time limit for the second question and subsequent questions is extended by a difference (rest time period) between the time limit set for the question (cumulated rest time limit+time limit for this question) and the time period for the answer. Therefore, the solver can use additional time period for the fixed time limit and can reduce the pressure of the time limit.

In the example of FIG. 20, the time limit for the first question cannot be extended. Therefore, by adopting a processing flow in FIG. 21, it becomes possible to extend the time limit for the first question in which the solver is susceptible to the pressure, and subsequent questions. Namely, the time period for the first question is extended by the added time period (hereinafter called alpha) in the parameter table DB 347. If the cumulated rest time period exceeds the alpha, the cumulated rest time period is decreased by the alpha and the cumulated rest time period is put back.

Here, the processing flow in FIG. 20 is explained in detail. At first, the program 313 for the time limit cumulating type adaptive test performs a processing for setting an initial difficulty for questions (step S191 ). It is possible not to set the initial difficulty, but to use "the difficulty for next question" determined at step S53 in FIG. 14 or at step S139 in FIG. 18. In such a case, a time period necessary for the entire test is extended by performing the initial test to distinguish the solvers, but since the difficulty, which is near the ability of the solver, has already been calculated by the initial test to distinguish the solvers, it becomes possible to hasten the convergence of the ability value in the time limit cumulating type adaptive test. In addition, at this step, it is also possible to refer to the difficulty when the initial difficulty for questions in parameter table DB 3,49 and to set and use this difficulty. Furthermore, it is also possible to make the skill selecting program 325 prompt the solver who operates the user terminal 5 to select the skill level.

Then, the added time period (alpha) for the first question is set to "the cumulated rest time period" column in the test history DB 339 (step S193). By this configuration, the time limit set for the first question is extended by the added time period for the first question (alpha). Next, the test question selecting routine 323 selects a question with the set difficulty (step S195). Here, the program 313 for the time limit cumulating type adaptive test sets to the test history DB 339, a skill category code, a version number, a skill category inside code, a user ID, a test date, a test time, a flag representing the solver is answering, and etc. In addition, at this time, it is possible to register the same information into the question outputting history DB 341.

After that, the time limit calculating routine 319 calculates the time limit at this time by (cumulated rest time period (cumulated rest time period in test history DB 339)+ the time limit set for the question (the time limit for answer in the question master DB 347) (step S197). Then, the program 313 for the time limit cumulating type adaptive test transmits via the network 1 to the user terminal 5, information regarding the selected question (information in the question master DB 347 and the test skill master DB 345) (step S199). Then, the solver operates the user terminal 5 and inputs an answer. The user terminal 5 transmits the input answer to the server 3. The program 313 for the time limit cumulating type adaptive test in the server 3 receives and gets the answer from the solver (step S201). The program 313 for the time limit cumulating type adaptive test also transmits an applet to display the time or to notify the time via voice or the applet to measure the time with the information regarding the selected question. These steps S199 and S201 are performed according to a processing flow shown in FIG. 15, FIG. 16 or FIG. 17. Information regarding the time period calculated at the step 5197 may be set to the applet to display the time or to notify the time via voice, and the time limit may be notified to the solver by the display or via voice.

The program 313 for the time limit cumulating type adaptive testin the server 3 judges whether the answer time period exceeds the time limit (the time limit for answer in the question master DB 347) (step S203). If the answer time period exceeds the time limit, 0 point is assigned (step S205), and 0, which is the rest time period, is registered into "cumulated rest time period" column in the test history DB 339 (step S207). If the answer time period does not exceed the time limit, the marking routine 321 refers to the right answer in the question master DB 347 and the answer information stored in the storage device and performs marking (step S209). Here, the program 313 for the time limit cumulating type adaptive test registers to the test answer contents DB 343 and the question outputting history DB 341, the result of the marking and contents of the test performance. In addition, data regarding the point and the number of questions and so on in the test history DB 339 is changed.

Then, the time limit calculating routine 319 refers to the cumulated rest time period in the test history DB 339 and the time limit for answer in the question master DB 347, and calculates (the cumulated rest time period+the time limit set for the question−time period consumed for the question (the time limit for answer)), then registers the calculation result into "the cumulated rest time period" column in the test history DB 339, again (step S211). In principle, (The cumulated rest time period+the time limit set for the next question) is a time limit for the next question.

However, the alpha is temporally added, and it is necessary to put the alpha back to 0 if the cumulated rest time period exceeds the alpha. Therefore, the program 313 for the time limit cumulating type adaptive test judges whether or not the alpha has already been subtracted from the cumulated rest time period (step S213). The judgment is performed by referring to the flag representing whether or not the time period (alpha) added to the time limit set for the first question has already been subtracted. That is, if the flag indicates "0", the time period (alpha) has not been subtracted yet. If the flag indicates "1", the time period (alpha) has already been subtracted. If the time period (alpha) has already been subtracted, processing shifts to step S221. On the other hand, if the time period (alpha) has not been subtracted yet, it is determined whether (the cumulated rest time period in the test history DB 339−alpha) is higher than 0 (step 9215), which is used to determine whether the cumulated rest time period is longer than the alpha.

If (the cumulated rest time period in the test history DB 339−alpha)>0 is not satisfied, processing shifts to step S221. If (the cumulated rest time period−alpha)>0 is satisfied, since it is possible to subtract the time period added to the first question (the alpha) from the cumulated rest time period, the program 313 for the time limit cumulating type adaptive test registers (cumulated rest time period−alpha) into "cumulated rest time period" column in the test history DB 339 (step S217). Then, the flag representing whether or not the alpha has already been subtracted (the flag representing whether or not the time period added to the time limit for the first question has already been subtracted in the test history DB 339) is set ON (1) (step S219).

After the step S213, S215 or S219, the ability value calculating routine 317 calculates the ability value from the marking result (step S221). The calculated ability value is stored in "the ability value" column in the test history DB 339. The difficulty parameter stored in the question master DB 347 is used for the calculation of the ability. Then, it is confirmed whether or not the number of output questions until here is equal to or higher than the maximum number of output questions in the time limit cumulating type adaptive test (the maximum number of output questions in the parameter table DB 349) (step S223). If the number of output questions is equal to or lower than the maximum number of output questions in the program 313 for the time limit cumulating type adaptive test, the program 313 for the time limit cumulating type adaptive test judges whether or not the ability value calculated at the step S221 converges and is in the settlement state (step S225). The judgment whether or not the ability value is in the settlement state is performed based on the value of the convergence error at the ability value calculation in the parameter table DB 349. If it is determined that the ability value indicates the settlement state, the processing flow completes. The ability value calculated at the step S221 just before is an ability value for the solver. On the other hand, if it is judged that the ability value is not in the settlement state, the difficulty for the next question is determined based on the ability value calculated at the step S221 (step S227). That is, if the ability value becomes higher, the difficulty is made higher. If the ability value becomes lower, the difficulty is made lower. Then, the processing flow returns to step S195.

On the other hand, if the number of output questions exceeds the maximum number of output questions in the time limit cumulating type adaptive test, the processing ends. The ability value calculated at the step 5221 just before is an ability value for the solver.

By performing such a processing, the time limit for the first question is extended by a predetermined added time period for the first question. Therefore, the solver can make additional time period for the fixed time limit and can reduce the pressure of the time limit.

As described above, one embodiment of the present invention is explained, but the present invention is not limited to the above embodiment. For example, in the above embodiment, the test question is transmitted through the network 1 from the server 3 to the user terminal 5 and the answer is input at the user terminal 5 and transmitted to the server 3. However, it is possible to install a program, which causes the user terminal 5 to perform the above described processing, into the user terminal 5, and to realize the whole of the above described processing only by the user terminal 5. In this case, only the calculated ability value may be transmitted through the network 1 to the server 3 and registered into the test history DB 339.

Furthermore, processing flows shown in FIG. 13 to FIG. 21 are examples. Various modifications are possible to perform the same processing. For example, the order of the steps may be exchanged and some steps may be simultaneously executed.

As described above, according to the present invention, it is possible to provide technology to reduce the pressure of a time limit, which is an obstruction to a proper evaluation of the ability of the adaptive test to evaluate a solver.

In addition, it is also possible to provide technology to reduce the pressure for persons who is sensitive to the pressure of the time limit.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method to perform an adaptive test on a computer, the method performed by the computer, comprising:

performing a pressure sensitivity test to examine a pressure sensitivity of a solver to time;

judging, based on a result of said pressure sensitivity test, whether or not said pressure sensitivity of said solver is equal to or higher than a predetermined threshold;

if it is judged that said pressure sensitivity of said solver is equal to or higher than said predetermined threshold, prompting said solver to answer a pending question;

acquiring an input of said answer for said pending questions from said solver; and determining if a time period consumed by said solver in answering said pending question is shorter than a time limit set for answering said pending question and, if shorter, giving said solver an increased time limit for answering a next question, following said pending question, calculated by adding a difference time period between said time limit set for answering said pending question and said time period consumed by said solver in answering said pending question, to a time limit set for answering said next question.

2. The method set forth in claim 1, wherein said performing a pressure sensitivity test comprises:

calculating a first ability value from a first test result if time is notified to said solver;

calculating a second ability value from a second test result if said time is not notified to said solver; and calculating said pressure sensitivity as a difference between said second ability value and said first ability value.

3. A computer program, stored on a computer readable medium, causing a computer to perform an adaptive test by:

performing a pressure sensitivity test to examine a pressure sensitivity of a solver to time;

judging, based on a result of said pressure sensitivity test, whether or not said pressure sensitivity of said solver is equal to or higher than a predetermined threshold;

if it is judged that said pressure sensitivity of said solver is equal to or higher than said predetermined threshold, prompting said solver to answer a pending question;

acquiring an input of said answer for said pending question from said solver; and determining if a time period consumed by said solver in answering said pending question is shorter than a time limit set for answering said pending question and, if shorter, performing a setting enabling said solver to use an increased time limit for answering a next question, following said pending question, calculated by adding a difference time period, between said time limit set for answering said pending question and said time period consumed by said solver in answering said pending question, to a time limit set for answering said next question.

4. The computer program set forth in claim 3, wherein said performing a pressure sensitivity test comprises:

calculating a first ability value from a first test result if time is notified to said solver;

calculating a second ability value from a second test result if said time is not notified to said solver; and calculating said pressure sensitivity as a difference between said second ability value and said first ability value.

5. A computer program, stored on a computer readable medium, causing a computer to perform an adaptive test by:

adding a predetermined time period to a time limit set to answer a first question;

prompting a solver to answer a pending question, which is any of said first question and subsequent questions;

acquiring an input of an answer for said pending question from said solver;

determining if a time period consumed by said solver in answering said pending question is shorter than a time limit set for answering said pending question;

if shorter, judging whether nor not a difference time period between a time limit set for answering said pending question and said time period consumed by said solver in answering said pending question has reached said predetermined time period;

if it is judged that said difference time period has reached said predetermined time period, performing a setting so as to enable said solver to use a sum of a difference, between said difference time period and said predetermined time period, and the time limit set to answer a next question, following said pending question, for answering said next question; and if it is judged that said difference time period has not reached said predetermined time period, performing a setting so as to enable said solver to use a sum of said difference time period and the time limit set to answer said next question, for answering said next question.

6. The computer program set forth in claim 5, further comprising:

performing a pressure sensitivity test to examine a pressure sensitivity of said solver to time; and judging, based on a result of said pressure sensitivity test, whether nor not said pressure sensitivity of said solver is equal to or higher than a predetermined threshold and, if it is judged that said pressure sensitivity of said solver is equal to or higher than said predetermined threshold, performing said adding, said prompting, said acquiring, said determining, said judging, and said performing of the setting.

7. The computer program set forth in claim 6, wherein said performing a pressure sensitivity test comprises:

calculating a first ability value from a first test result if time is notified to said solver;

calculating a second ability value from a second test result if said time is not notified to said solver; and calculating said pressure sensitivity as a difference between said second ability value and said first ability value.

8. A method to perform an adaptive test, comprising:

adding a predetermined time period to a time limit set to answer a first question;

prompting, through a user terminal, a solver, to answer a pending question, which is any of said first question and subsequent questions;

acquiring, through the user terminal, an input of an answer for said pending question from said solver;

determining if a time period consumed by said solver in answering said pending question is shorter than a time limit set for answering said pending question;

judging whether or not a difference time period between a time limit set for answering said pending question and said time period consumed by said solver in answering said pending question has reached said predetermined time period, if said time period consumed by said solver in answering said pending question is shorter than said time limit set for answering said pending question;

performing a setting enabling said solver to use a sum of a difference, between said difference time period and said predetermined time period, and the time limit set to answer a next question, following said pending question, for answering said next question, if it is judged that said difference time period has reached said predetermined time period, and performing a setting enabling said solver to use a sum of said difference time period and the time limit set to answer said next question, for answering said next question, if it is judged that said difference time period has not reached said predetermined time period.

9. The method set forth in claim 8, further comprising:

performing a pressure sensitivity test to examine a pressure sensitivity of said solver to time;

judging, based on a result of said pressure sensitivity test, whether or not said pressure sensitivity of said solver is equal to or higher than a predetermined threshold; and activating, if it is judged that said pressure sensitivity of said solver is equal to or higher than said predetermined threshold, said adding, said prompting, said acquiring, said determining, said judging, said performing a setting.

10. A method to perform an adaptive test, comprising:

displaying on a user terminal a first question and information regarding a first time limit for answering said first question, said first time limit calculated by adding a time limit preset for answering said first question and a predetermined time period;

acquiring an answer for said first question from a solver; and if said solver answers said first question before said time limit for answering said first question has elapsed, displaying on said user terminal a second question and information regarding a second time limit for answering said second question, as an enlarged time period to answer said second question;

wherein:

if an unused remainder of said first time limit has reached said predetermined time period, said second time limit is a sum of a difference, between said unused remainder of said first time limit and said predetermined time period, and the time limit preset to answer said second question, and if said unused remainder of said first time limit has not reached said predetermined time period, said second time limit is a sum of said unused remainder of said first time limit and the time limit preset to answer said second question.

11. A method to perform an adaptive test, comprising:

displaying on a user teminal a first question and a time period progressing from a starting time to a first time limit to answer said first question, said first time limit calculated by adding a time limit preset for answering said first question and a predetermined time period;

acquiring an answer for said first question from a solver; and if said first solver answers said first question before said first time limit to answer said first question has elapsed, displaying a second question on the user terminal and a time period that can progress from a starting time to a second time limit, as an enlarged time period for answering said second question;

wherein:

if an unused remainder of said first time limit has reached said predetermined time period, said second time limit is a sum of a difference, between said unused remainder of said first time limit and said predetermined time period, and the time limit preset to answer said second question, and if said unused remainder of said first time limit has not reached said predetermined time period, said second time limit is a sum of said unused remainder of said first time limit to answer said first question and the time limit preset to answer said second question.

* * * * *